(12) United States Patent
Khire

(10) Patent No.: US 7,537,415 B2
(45) Date of Patent: May 26, 2009

(54) FLUID DISTRIBUTION AND COLLECTION IN LANDFILLS AND CONTAMINATED SITES

(75) Inventor: Milind V. Khire, Holt, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 11/980,050

(22) Filed: Oct. 29, 2007

(65) Prior Publication Data

US 2008/0131206 A1 Jun. 5, 2008

Related U.S. Application Data

(62) Division of application No. 11/198,754, filed on Aug. 5, 2005, now Pat. No. 7,309,189.

(60) Provisional application No. 60/599,623, filed on Aug. 6, 2004.

(51) Int. Cl.
*B09B 1/00* (2006.01)

(52) U.S. Cl. .................... 405/129.95; 405/129.5

(58) Field of Classification Search ............ 405/129.95, 405/129.57, 129.45, 129.5, 129.7, 129.75, 405/129.85

See application file for complete search history.

(56) References Cited

U.S. PATENT DOCUMENTS 6,283,676 B1* 9/2001 Hater et al. ............. 405/129.57
6,471,443 B1* 10/2002 Renaud ................. 405/129.95

* cited by examiner

*Primary Examiner*—John Kreck
(74) *Attorney, Agent, or Firm*—Ian C. McLeod

(57) ABSTRACT

A fluid injection and removal system to inject or remove fluids from a landfill or contaminated area. The system allows for treatment of waste in the landfill or the contaminated area. The fluid injection and removal system includes a permeable layer and at least one perforated pipe. The permeable layer enables essentially uniform distribution of the fluid into the underlying waste or contaminated area. The fluid injection and removal system can be combined with a leachate collection system to create a leachate recirculation system for use in a landfill. The leachate collection system includes at least one perforated collection pipe embedded in a drainage layer. Sensors can be provided in the permeable layer to enable the change in the physical characteristics of the waste adjacent the permeable layer to be monitored.

21 Claims, 22 Drawing Sheets

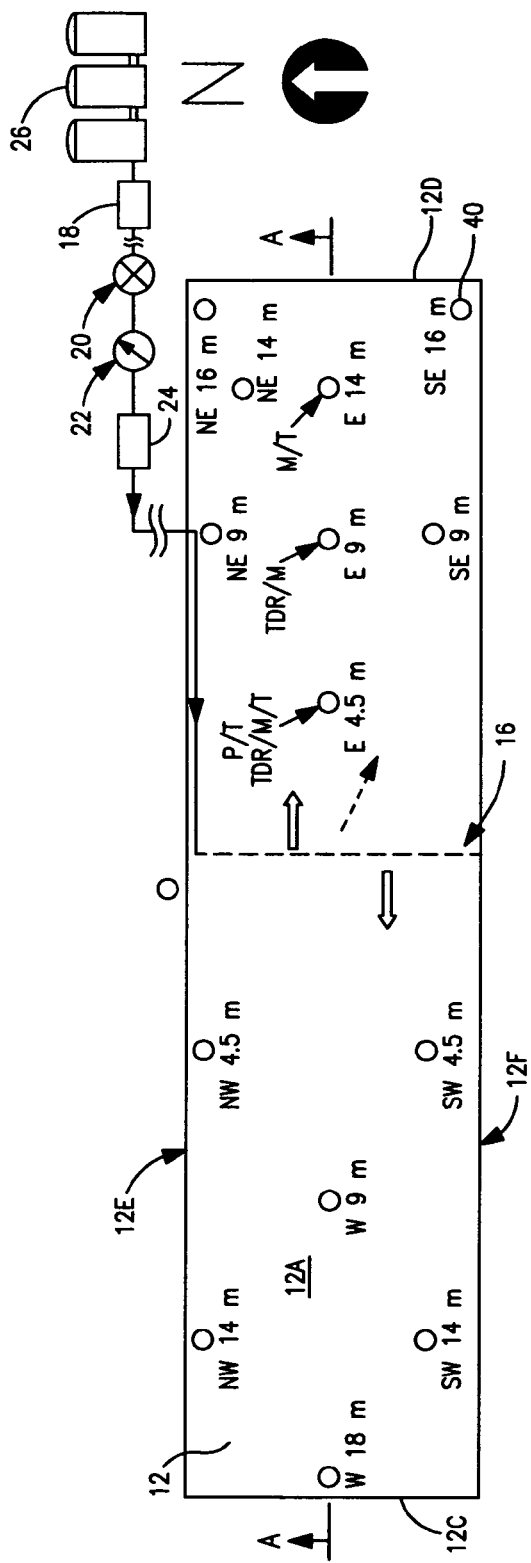
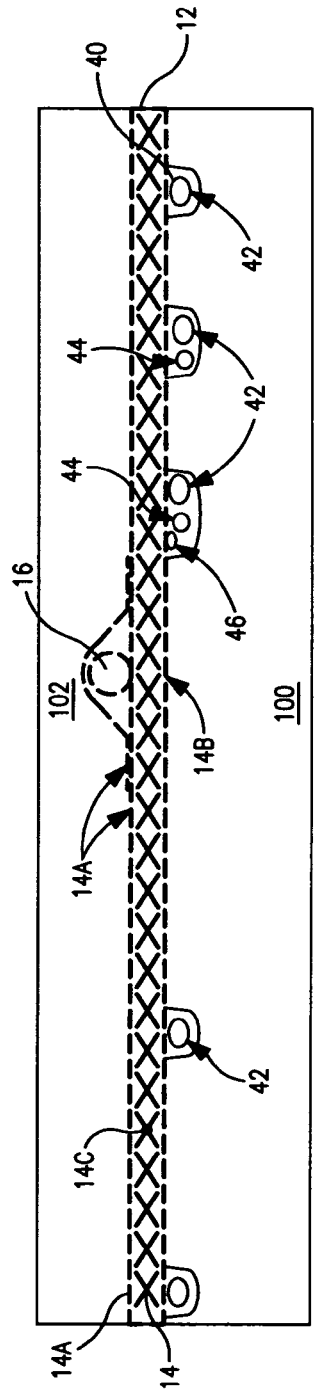
FIG. 2
FIG. 3

FLUID DISTRIBUTION AND COLLECTION IN LANDFILLS AND CONTAMINATED SITES

CROSS-REFERENCE TO RELATED APPLICATIONS

This application is a divisional of application Ser. No. 11/198,754 file on Aug. 5, 2005 now U.S. Pat. No. 7,309,189.

This application claims priority to Provisional Application Ser. No. 60/599,623, filed Aug. 6, 2004

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION

1. Field of the Invention

The present invention relates to fluid distribution and optionally collection in solid waste in landfills; and particularly bioreactive landfills and contaminated sites. In one aspect, the present invention relates to waste treatment liquid collection and recirculation in solid waste in landfills. In another aspect, the present invention relates to remediation of contaminants in the contaminated liquid or contaminated subsurface. In both instances, layer of a permeable, hydraulically conductive material is provided to allow the distribution of the fluids into the layer and from the layer into the landfill or contaminated site. The invention also relates to the use of sensors in the layer to collect data about the surrounding area.

2. Description of Related Art

The key difference between a "dry tomb" landfill and a bioreactor landfill is that bioreactor landfills require controlled addition of leachate or moisture to the solid waste in the landfill. The recirculation of leachate, other liquids, or fluids (e.g., steam, air) to the solid waste in the landfill is a major component in bioreactor landfills. The addition of leachate or moisture increases waste decomposition. Environmental and economical benefits of leachate recirculation for municipal solid waste landfills or bioreactor landfills are well documented. These benefits include a reduction in the leachate treatment and disposal costs, accelerated decomposition and increased settlement of waste resulting in an air-space gain, an increase in the rate of gas production, acceleration in the generation of landfill gas and which results in a potential for higher short-term revenues from a gas-to-energy system, reduction in the risk associated with contamination during off-site transportation, treatment, and disposal of leachate and potential reduction in the post-closure care period and maintenance costs. Risks and drawbacks of leachate recirculation include, a potential decrease in the slope stability of landfills, a potential increase in the leachate head on the liner, if leachate collection system is not designed to efficiently drain injected and recirculated leachate, potential flooding of the gas collection system, and possible leachate seepage from the landfill side slopes, if an adequate buffer distance is not maintained.

The most common leachate recirculation techniques are broadly divided into surface and subsurface applications. Surface applications include direct application of leachate or spray irrigation of leachate on the landfill surface and surface ponding of leachate. Climate dependency, odor problems, interference with daily operations, poor aesthetics, and potential runoff of applied leachate into storm water management system are the drawbacks of surface application techniques. Conventional subsurface application methods include vertical wells and horizontal trenches. Horizontal trenches are most commonly used in relatively new, municipal solid waste landfills. It is most cost effective to install horizontal trenches before the landfill is capped at the design elevation in the landfill cell. Vertical wells can interfere with landfill daily operations. However, vertical wells can be installed after a landfill is capped or can be retrofit into existing landfills. Therefore, vertical wells are most commonly used in retrofit landfills or where implementing horizontal trenches is not feasible or cost effective. Disadvantages and limitations of vertical wells and horizontal trenches include odor problems during installation due to excavation of waste, high capital cost of construction; and non-uniform distribution of leachate due to the formation of "dry zones" or "dry pockets" where injected leachate cannot reach. Such dry zones can reduce the quantity and rate of landfill gas generated. The dry zones can also lead to differential settlement of waste which can result in greater landfill cap maintenance costs. In addition, the amount of leachate that can be recirculated by these methods may not be sufficient to get rid of all leachate typically produced by landfills located in humid regions.

The related patent art for municipal solid waste sites is evidenced by U.S. Pat. Nos. 5,855,664 to Bielecki et al and 6,599,058 to Arnold.

There remains the need for a system and method of distributing and collecting fluids from a portion of a landfill or contaminated site which allows for uniform distribution of the fluid into the landfill or contaminated site and which is economical and easy to install.

SUMMARY OF THE INVENTION

A fluid injection and removal system for use in solid waste landfill, landfill cell or contaminated area. The system allows for the injection of fluids and the removal of fluids from a landfill, landfill cell or contaminated area. The system also allows for treatment or remediation of the waste in the landfill or the contaminated area (or subsurface) or the ground water removed from or injected into the landfill or contaminated area. The fluid injection and removal system includes a permeable layer and at least one perforated pipe. The permeable layer and perforated pipe are in fluid communication. The permeable layer is constructed of a permeable material having a hydraulic conductivity greater than the hydraulic conductivity of the underlying waste or contaminated area. The permeable layer enables essentially uniform distribution of the fluid injected into the permeable layer into the underlying waste or contaminated area. The permeable layer can be a geocomposite drainage layer. The permeable layer can be constructed of an inert or reactive material. Use of a reactive material allows for treatment of the fluid as it passes through the permeable layer. The fluid injected into the landfill can be used to accelerate the decomposition of the waste such as in a bioreactive landfill. The fluid can include a surfactant which helps to reduce the concentration of contaminants in the underlying waste or contaminated area. The fluid injection and removal system can be combined with a leachate collection system to create a leachate recirculation system for use in a landfill or landfill cell. The leachate collection system includes at least one perforated collection pipe embedded in a drainage layer. The leachate collection system may also include a liner.

To use the fluid injection and removal system, the permeable layer is positioned on the surface of the waste or contaminated area. The perforated pipe is then positioned within or immediately outside the permeable layer on a side opposite the waste or contaminated area. Additional waste or soil can then be positioned on the top of the permeable layer and perforated pipe. Several fluid injection and removal systems can be used in a single landfill at different elevations. When the fluid injection and removal system is used as part of a leachate recirculation system, the leachate collection system is placed at the bottom of the landfill. Once the fluid injection and removal system is installed, the fluid is injected into the perforated pipe and into the permeable layer. The fluid moves through the permeable layer into the underlying waste or contaminated area. If the fluid injection and removal system is part of the leachate recirculation system, liquid moves from the perforated pipe, through the permeable layer and down through the waste to the collection pipe of the leachate collection system. The collected leachate is then removed from the leachate collection system. The collected leachate can be injected again into the waste using the fluid injection and removal system. To use the fluid injection and removal system to remove gases or vapors, gases or vapors from the waste move into the same perforated pipe that is used for the fluid injection or a separate devoted perforated pipe or pipes can be used. A vacuum or gravity driven system connected to the perforated pipe removes the gases or vapors from the perforated pipe.

Sensors can be provided in the permeable layer to estimate the physical characteristics or the change in the physical characteristics of the waste or contaminated area adjacent the permeable layer to be monitored. The data from the sensors can be used to increase the efficiency of the landfill or to assist in the design of more efficient landfills.

The present invention relates to a method for injecting a waste treatment fluid or any fluid including water into a portion of solid waste in a landfill which comprises the steps of: providing a layer constructed of a permeable material having hydraulic conductivity, and having a first surface and an opposed second surface, and a perforated pipe positioned adjacent the layer, wherein the layer is positioned on the portion of the solid waste of the landfill so that the second surface of the layer is adjacent to and above the portion of solid waste; and injecting the fluid into the perforated pipe under positive pressure so that the fluid exits the pipe and travels into and through the layer and is distributed into the portion of solid waste adjacent the layer.

Further, the present invention relates to a method for installing a fluid injection system into a portion of solid waste in a landfill which comprises the steps of: providing a layer constructed of a permeable material having hydraulic conductivity and having a first surface and an opposed second surface forming a plane of the layer; positioning the layer on the portion of solid waste of the landfill so that the second surface of the layer is adjacent the solid waste; and positioning a perforated pipe adjacent the layer.

Still further, the present invention relates to a method of collecting and recirculating waste treatment liquid in a portion of solid waste in a landfill which comprises the steps of: providing a fluid injection system including a layer constructed of a permeable material having hydraulic conductivity and having a first surface and an opposed second surface, a perforated pipe adjacent the layer and a waste treatment liquid collection system spaced apart from the fluid injection system, wherein the layer is positioned on the portion of the solid waste so that the second surface of the layer is adjacent to and above the portion of solid waste and the waste treatment liquid collection system is positioned at a bottom of the portion of solid waste in the landfill; injecting a waste treatment liquid into the perforated pipe under positive pressure so that the waste treatment liquid moves into and travels through the layer and is distributed into the portion of solid waste adjacent the second surface of the layer and wherein the waste treatment liquid moves down through the portion of the solid waste toward the waste treatment liquid collection system due to gravity; and collecting the waste treatment liquid using the waste treatment liquid collection system after the waste treatment liquid passes through the solid waste.

Further still, the present invention relates to a method of installing a waste treatment liquid recirculation system in a portion of solid waste in a landfill which comprises the steps of: providing a layer having a first surface and an opposed second surface constructed of a permeable material having hydraulic conductivity and forming a plane of the layer; positioning the layer on the portion of solid waste so that the second surface of the layer is adjacent the portion of solid waste in the landfill; positioning a perforated pipe adjacent the layer; providing a waste treatment liquid collection system; and positioning the waste treatment liquid collection system in the portion of solid waste spaced part from and below the layer and perforated pipe.

Further, the present invention relates to a method of installing a waste treatment liquid recirculation system in a portion of solid waste in a landfill which comprises the steps of: providing a layer having a first surface and an opposed second surface constructed of a permeable material having hydraulic conductivity and forming a plane of the layer; positioning the layer on the portion of solid waste so that the second surface of the layer is adjacent the portion of solid waste in the landfill; positioning a perforated pipe adjacent the layer; providing a waste treatment liquid collection system; and positioning the waste treatment liquid collection system in the portion of solid waste spaced part from and below the layer and perforated pipe.

Further still, the present invention relates to a method for collecting and removing gases from a portion of solid waste of a landfill which comprises the steps of: providing a layer constructed of a permeable material which allows for gases to flow into the layer and one or more perforated pipes, the layer having a first surface and an opposed second surface and wherein the layer is positioned on the portion of solid waste in the landfill so that the second surface of the layer is adjacent the solid waste and one or more of the perforated pipes are positioned adjacent to the layer; providing a suction system connected to the perforated pipe; moving the gases from the portion of solid waste adjacent the layer into the layer; and activating the suction system to move the gases from the portion of solid waste and into the perforated pipe and to remove the gases from the perforated pipe.

Still further, the present invention relates to a system for injecting fluid into a portion of solid waste in a landfill which comprises: a layer constructed of a permeable material having a hydraulic conductivity and having a first surface and an opposed second surface forming a plane of the layer, wherein the layer is configured to be positioned on the portion of solid waste in the landfill so that the second surface of the layer is adjacent the solid waste; and a perforated pipe positioned adjacent the layer parallel to the plane of the layer, wherein fluid is injected into the perforated pipe and moves from the perforated pipe into the layer and travels through the layer and into the portion of solid waste adjacent the second surface of the layer.

Further, the present invention relates to a system for collecting and recirculating waste treatment liquid in a portion of solid waste in a landfill which comprises: a layer constructed of a permeable material having a hydraulic conductivity and having a first surface and an opposed second surface forming a plane of the layer, the layer configured to be positioned on the portion of solid waste in the landfill so that the second surface of the layer is adjacent the solid waste of the landfill; a perforated pipe positioned adjacent the layer parallel to the plane of the layer; and a waste treatment liquid collection system including at least one perforated collection pipe embedded in a layer of hydraulically conductive material, wherein the waste treatment liquid collection system is positioned in the portion of solid waste of the landfill adjacent to and spaced apart from the second surface of the layer, wherein the waste treatment liquid is injected into the layer through the perforated pipe and travels through the layer and is distributed into the solid waste adjacent the second surface of the layer and moves downward through the portion of solid waste toward the waste treatment liquid collection system due to gravity and moves through the hydraulically conductive material of the waste treatment liquid collection system and into the perforated collection pipe.

Finally, the present invention relates to a method for determining physical characteristics of a portion of solid waste in a landfill which comprises the steps of: providing a layer constructed of a permeable material having hydraulic conductivity with a first surface and an opposed second surface and sensors mounted in the layer adjacent the second surface and a perforated pipe positioned adjacent the layer, wherein the layer is positioned on the portion of the solid waste of the landfill so that the second surface of the layer is adjacent to and above the portion of solid waste; activating the sensors; obtaining data from the sensors; and determining from the data, physical characteristics or changes in the physical characteristics of the portion of solid waste adjacent the second surface of the layer.

One of the advantages of the present invention, is that excavation of waste is not needed to install and construct the permeable layer. Therefore no odors are released during installation and construction of the permeable layer. Another advantage is that installation costs are lower since a single permeable layer can be used in place of multiple horizontal trenches or vertical wells. Permeable layers also result in relatively uniform distribution of injected leachate below the permeable Layer which could result in reduction in differential settlement and related post-closure maintenance costs. Permeable layers made up of granular materials provide an ideal platform to embed sensors for monitoring the pressure, temperature and other physical, chemical, or biological parameters associated with the migration of injected liquids. Permeable or granular layers offer advantages over conventional horizontal trenches including a significant increase in the quantity of leachate that can be recirculated per unit mass of waste. A permeable layer is hydraulically more efficient than horizontal trenches at uniformly wetting the underlying waste. Permeable layers can achieve relatively uniform distribution of moisture (or leachate) which reduces dry pockets and reduces differential settlement of the waste. Use of a permeable layer also increases the gas production rate of the waste.

The substance and advantages of the present invention will become increasingly apparent by reference to the following drawings and the description.

BRIEF DESCRIPTION OF DRAWINGS

FIG. 2 is a schematic plan view of a fluid injection and removal system 10 showing the permeable layer 12, the perforated pipe 16 and the pump 18, the flow gauge 24, the pressure gauge 22, the control valve 20 and the sensor locations.

FIG. 3 is a schematic cross-sectional front view of a fluid injection and removal system 10 where the permeable layer 12 is a geonet 14C spaced between upper and lower geotextiles 14A and 14B with the perforated pipe 16 placed above the geonet 14C and showing the sensors 40.

DESCRIPTION OF PREFERRED EMBODIMENTS

Figure 1A:
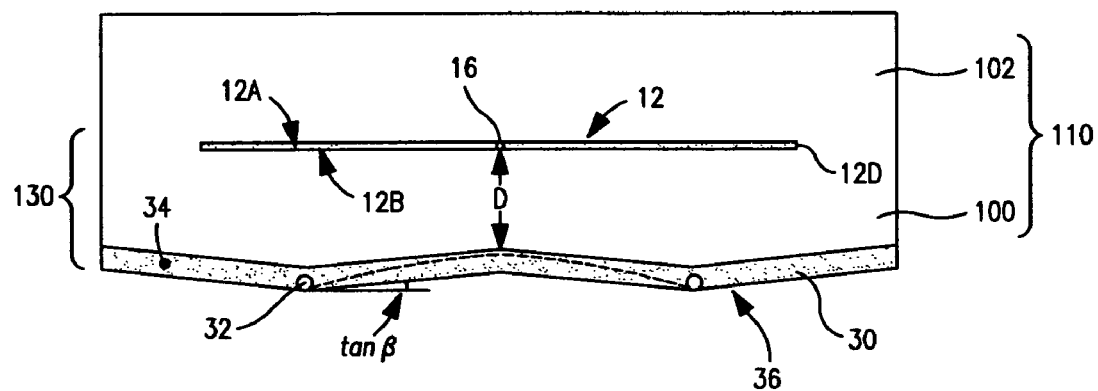
FIG. 1A is a schematic cross-sectional front view of a leachate recirculation system 130 in waste 100 in a landfill 110.

The fluid injection and removal system 10 of the present invention includes a permeable layer 12 and a perforated pipe 16. The fluid injection and removal system 10 is used to inject fluids 50 or 52 into a portion of solid waste 100 in a landfill 110, a landfill cell or contaminated site and to remove fluids 50 or 52 including leachate, gases and vapors 52 from the solid waste 100, landfill cell or contaminated site. The system 10 can be used to inject liquid 50 such as water or gases such as air into the solid waste 100 or landfill cell to increase the decomposition or degradation of the solid waste 100. The system 10 can also be used to inject fluids into the solid waste 100, landfill cell or contaminated area 120 to treat the solid waste 100 or contaminated area 120 for remediation of the solid waste 100 or contaminated area 120.

Figure 1B:
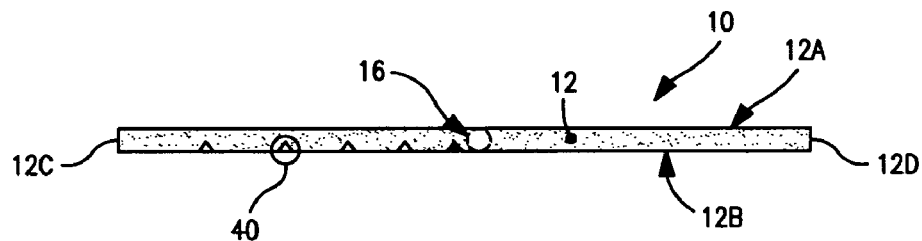
FIG. 1B is a schematic cross-sectional front view of the fluid injection and removal system 10 showing the permeable layer 12, the perforated pipe 16 and the sensors 40.

The permeable layer 12 has a first surface 12A and an opposed second surface 12B forming a plane A-A of the permeable layer 12 (FIGS. 1A, 1B and 2). The permeable layer 12 has opposed ends 12C and 12D and opposed sides 12E and 12F with a length between the ends 12C and 12D and a width between the sides 12E and 12F. The shape and size of the permeable layer 12 can vary. When the system 10 is used to inject fluids into the solid waste 100 of a landfill 110 or landfill cell or into a contaminated area 120, the size and shape of the permeable layer 12 is determined based on the recirculation or fluid injection needs of the solid waste 100 or contaminated area 120, the shape of the solid waste 100 or contaminated area 120, the relative contrast in the hydraulic conductivity of the permeable layer 12 and the underlying waste or contaminated area 120 and the injection rate and pressure of the fluid.

In one (1) embodiment, the length of the permeable layer 12 between the ends 12C and 12D is approximately between 30 m to 60 m (100 to 200 ft). The permeable layer 12 is constructed of a thin layer of permeable material having a high hydraulic conductivity. The depth or thickness of the permeable layer 12 between the first and second surface can vary depending upon the material used to construct the permeable layer 12, the design of the landfill site and the operational variables of the landfill 110 and the permeable layer 12. A permeable layer 12 constructed of a geocomposite material can have a thickness of approximately 10 mm (0.39 inches), whereas a permeable layer 12 made up of shredded tires can have thickness of 0.6 m (1.97 ft) depending on the size of the tire shreds. The permeable layer 12 is constructed of a material having a hydraulic conductivity greater than the hydraulic conductivity of the underlying waste or the surrounding area or soil or the contaminated area 120. The permeable layer 12 can be constructed of coarse sand, pea gravel, or granular recycled materials such as shredded tires, crushed glass, or any material having a similar hydraulic conductivity. The hydraulic conductivity of crushed glass is approximately $3 \times 10^{-2}$ m/s. The hydraulic conductivity of shredded rubber tires in Example 2 is approximately 0.1 m/s. In one (1) embodiment, the permeable layer 12 is a geocomposite drainage layer 14 (FIGS. 2 and 3). A geocomposite drainage layer 14 is a flat geosynthetic blanket that is used in landfills 110 as well as other civil and environmental drainage applications primarily as a leachate collection layer, a lead detection layer between primary and secondary liners of double lined landfills 110, or as a lateral drainage layer to drain infiltrated precipitation in landfill caps (Koerner 1999). The geocomposite drainage layer 14 includes a first or upper geotextile 14A and a second or lower geotextile 14B with a geonet 14C sandwiched between the upper and lower geotextile 14A and 14B (FIG. 3). A permeable layer 12 constructed as a geocomposite drainage layer 14 has good physical integrity against differential loading or settlement and a relatively small thickness. A geocomposite drainage layer 14 is constructed of a relatively high transmissivity material. Under equivalent hydraulic conditions, a geonet 14C having a thickness of 5 mm (0.19 inches) can be hydraulically equivalent to a gravel drainage layer having a thickness of between about 200 and 300 mm (7.87 and 11.81 inches). Geotextiles can be placed directly above and below the permeable layer 12 constructed of any material. The key purpose of geotextiles 14A and 14B is to separate the geonet 14C or permeable layer 12 from the surrounding porous material (e.g., soil, waste, etc.) and to prevent clogging of the geonet 14C or permeable layer 12. In one (1) embodiment, the lower geotextile 14B extends upward along the sides 12E and 12F and ends 12C and 12D of the geonet 14C or permeable layer 12. In one (1) embodiment, the lower geotextile 14B is woven to reduce clogging of the permeable layer 12 or geonet 14C. In one (1) embodiment, the upper geotextile 14A is non-woven to prevent the solid waste 100 from entering the permeable layer 12 or geonet 14C. In one (1) embodiment, both the upper and lower geotextiles 14A and 14B are non-woven.

The permeable layer 12 can be constructed of an inert material or a reactive material. A reactive material is any material which removes or reduces the concentration of contaminants in the fluid 50 and 52 as the fluid 50 and 52 moves through the permeable layer 12. Any reactive material well known in the art such as carbon or iron filings can be used to construct the permeable material. U.S. Pat. No. 5,730,550 to Andersland et al which is incorporated herein in its entirety by reference describes the use of iron filings and microorganisms to constructive reactive vertical barriers.

The fluid injection or removal system 10 includes at least one perforated pipe 16. In one (1) embodiment, the perforated pipe 16 is positioned adjacent to or embedded in the first surface 12A of the permeable layer 12. However, the perforated pipe 16 can be positioned at any location adjacent the permeable layer 12 provided the perforated pipe 16 is in fluid communication with the permeable layer 12. In the embodiment where the permeable layer 12 is a geocomposite drainage layer 14, the perforated pipe 16 is positioned between the upper geotextile 14A and the upper or first surface of the geonet 14C (FIG. 3). Multiple perforated pipes 16 can be used with a single permeable layer 12. In one (1) embodiment where the permeable layer 12 is a geocomposite drainage 14, one of the perforated pipes 16 is positioned between the second surface of the geonet 14C and the lower geotextile 14B. The shape of the perforated pipe 16 depends on the shape of the permeable layer 12. The perforated pipe 16 can be straight such as for use with a horizontal and level rectangular permeable layer 12 or can be spiral shaped or curved such as for use with a circular permeable layer 12 or a permeable layer 12 which is positioned on an uneven or curved surface. In one (1) embodiment, the perforated pipe 16 is constructed of high density polyethylene (HDPE). In one (1) embodiment, the perforated pipe 16 has an inner diameter of approximately 0.075 m (0.246 ft). However, the inner diameter of the perforated pipe 16 depends on the amount of fluid 50 or 52 to be injected or removed from the waste 100 or contaminated soil 124. The perforated pipe 16 has opposed ends. One end of the perforated pipe 16 is closed or capped off. In the embodiment where the system 10 is used to inject fluid 50 or 52, a pump 18 is connected to the other end of the perforated pipe 16. In this embodiment, a flow control valve 20, a pressure gauge 22 and a flow gauge 24 can be positioned in the perforated pipe 16 to control and monitor the pressure head and the flow rate of the injected fluid (FIG. 2). When the fluid injection and removal system 10 is used to remove fluid from the waste or contaminated site, a suction or vacuum system is connected to the other end of the perforated pipe 16. In one (1) embodiment, a storage container 26 is connected to the perforated pipe 16, and the fluid is moved to or from the perforated pipe 16 into or out of the storage container 26.

The fluid injection and removal system 10 can be used in combination with a leachate collection system 30 to form a leachate recirculation system 130 (FIG. 1A). The leachate collection system 30 includes at least one (1) perforated liquid recovery or collection pipe 32 positioned in a layer of porous drainage material 34. The perforated collection pipe 32 has opposed ends with a cap at one end. A suction, vacuum or gravity driven removal system is attached to the other end of the collection pipe 32. The system 130 can also include a storage container 26 for storing the leachate after removal. In one (1) embodiment, the collection pipe 32 is embedded in gravel as the drainage material 34. In one (1) embodiment, the hydraulic conductivity of the leachate collection system drainage material 34 $K_{LCS}$ is approximately equal to $10^{-2}$ m/s. In one (1) embodiment, the leachate collection system 30 includes two (2) perforated collection pipes 32 having an inner diameter of approximately 0.15 m (0.49 ft). In this embodiment, the two (2) collection pipes 32 are embedded in a layer of gravel approximately 0.3 m (0.98 ft) thick at a horizontal spacing of approximately 60 m (200 ft). In this embodiment, the slope of the leachate collection system 30 is approximately equal to 3.5%. In one (1) embodiment, the leachate collection system 30 includes a liner 36 which is positioned below the perforated collection pipe 32. In one (1) embodiment, the liner 36 extends along the sides 12E and 12F and ends 12C and 12D of the waste 100 and 102 forming a landfill cell. In one (1) embodiment, the liner 36 is constructed of a non-porous material. In one (1) embodiment, the suction or gravity driven removal system moves the recirculated leachate from the collection pipe 32 to the storage container 26. In one (1) embodiment, the recirculated leachate stored in the storage container 26 is pumped into the perforated pipe 16 of the fluid injection system 10 to be recirculated through the solid waste 100.

Figure 4:
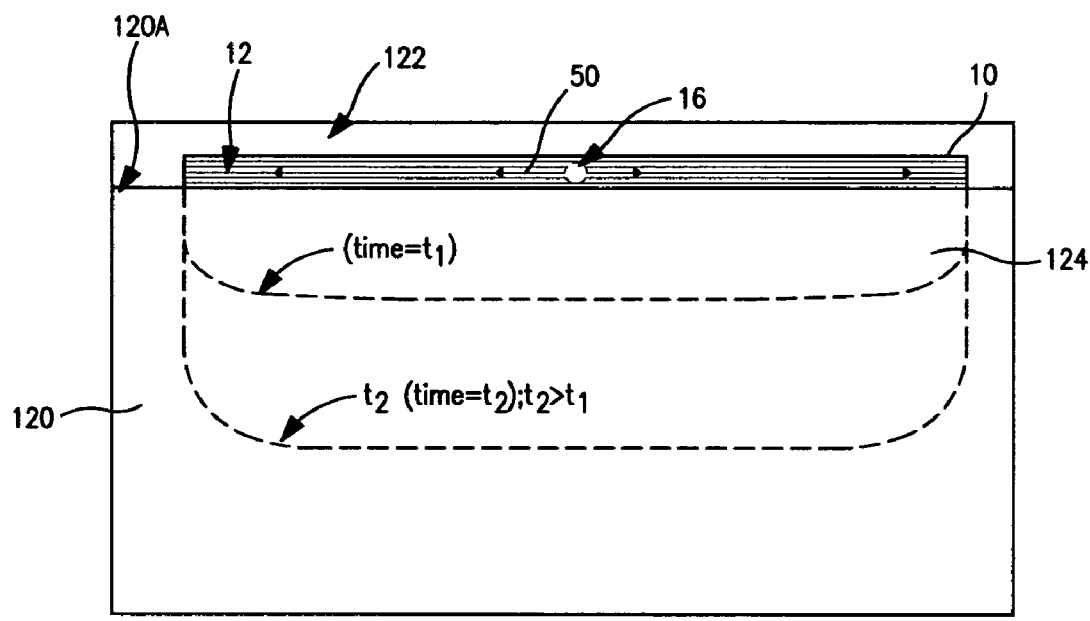
FIG. 4 is a schematic representation of a fluid injection and removal system 10 positioned on a top surface 120A of a contaminated area 120 for injecting a waste treatment liquid 50 into the contaminated area 120 showing the injected liquid front for time $t_1$ and the injected liquid front for time $t_2$ is greater than $t_1$.

The fluid injection and removal system 10 is used in a portion of a municipal solid waste landfill 110, landfill cell or contaminated area 120 to inject liquids or gases into the solid waste 100 of the landfill or soil 124 contaminated area 120 or remove liquids or gases from the solid waste 100 of the landfill 110 or the soil 124 of the contaminated area 120. In a bioreactive landfill 110, liquids or gases are injected into the waste to increase decomposition of the waste. However, liquids and gases can also be injected into the waste to treat the waste such as to reduce the concentration of the contaminants in the waste. The fluid injection system 10 can also be used on shallow contaminated soil 124 or impacted ground for remediation of the contaminated area 120 or impacted ground. Permeable layers 12 made of reactive materials can be used to treat ground water and release the ground water into subsurface. In one (1) embodiment, the permeable layer 12 is used to treat a shallow area where the soil 124 and/or ground water are contaminated at a depth less than or equal to 30 ft (FIG. 4). The permeable layer 12 can be used to deliver the appropriate chemicals or surfactants uniformly across the shallow contaminated zone 120 to wash the soil 124 or sediment particles or to react with the ground water to clean the ground water (FIG. 4).

To use the fluid injection or removal system 10, the fluid injection or removal system 10 is installed adjacent the solid waste 100 of the landfill 110 or the contaminated soil 124 of the contaminated ground. The system 10 can be installed at any filling stage of a landfill 110 before the landfill 110 is capped. Permeable layers 12 can be installed at various surface elevations within a solid waste landfill 110. Multiple fluid injection or removal systems 10 can be installed in a landfill 110 at different depths in the solid waste 100.

To install the fluid injection or removal system 10, the permeable layer 12 is first positioned on the surface of the portion of the solid waste 100 of the landfill 110 or the landfill cell or on top surface 120A of the contaminated area 120. In one (1) embodiment, the surface 120A of the solid waste 100 or contaminated area 120 is flattened and the permeable layer 12 is inclined or sloped. In one (1) embodiment, the surface 120A of the solid waste 100 or the contaminated area 120 is flattened to remove most bumps so that the permeable layer 12 is essentially flat. The permeable layer can be horizontal or along an inclined plane. The permeable layer 12 could also have a curved first or second surface 12A or 12B. The permeable layer 12 is positioned on the solid waste 100 or contaminated area 120 so that the second or lower surface 12B of the permeable layer 12 is adjacent the solid waste 100 or contaminated soil 124. In the embodiment where the permeable layer 12 is a geocomposite drainage layer 14, the lower geotextile 14B is positioned on the surface 120A of the solid waste 100 or the contaminated area 120 and the geonet 14C is positioned on the lower geotextile 14B on a side opposite the solid waste 100 or contaminated area 120. In one (1) embodiment, a distance of greater than 15 m (49.2 ft) between the edges of the permeable layer 12 and the side slopes of the landfill 110 was maintained to minimize the potential for leachate breakouts.

The perforated pipe 16 is then positioned adjacent the first surface 12A of the permeable layer 12. The perforated pipe 16 can be positioned essentially along either the length or width of the permeable layer 12. However, it is more efficient to position the pipe 16 across or along the shorter dimension of the permeable layer 12. In one (1) embodiment, the perforated pipe 16 is parallel to either the sides 12E and 12F or the ends 12C or 12D of the permeable layer 12. In one (1) embodiment, the perforated pipe 16 is parallel to the plane A-A of the permeable layer 12. In one (1) embodiment, the perforated pipe 16 is positioned in the center of the permeable layer 12 an equal distance from either the ends 12C and 12D or the sides 12E and 12F of the permeable layer 12 so as to divide the permeable layer 12 into two (2) essentially identical segments. In one (1) embodiment, the perforated pipe 16 extends the entire length or width of the permeable layer 12.

After the fluid injection and removal system 10 is installed, additional solid waste 102 or soil 122 can be positioned on the first surface 12A of the permeable layer 12 or on the upper geotextile 14A of the geocomposite drainage layer 14.

Figure 5:
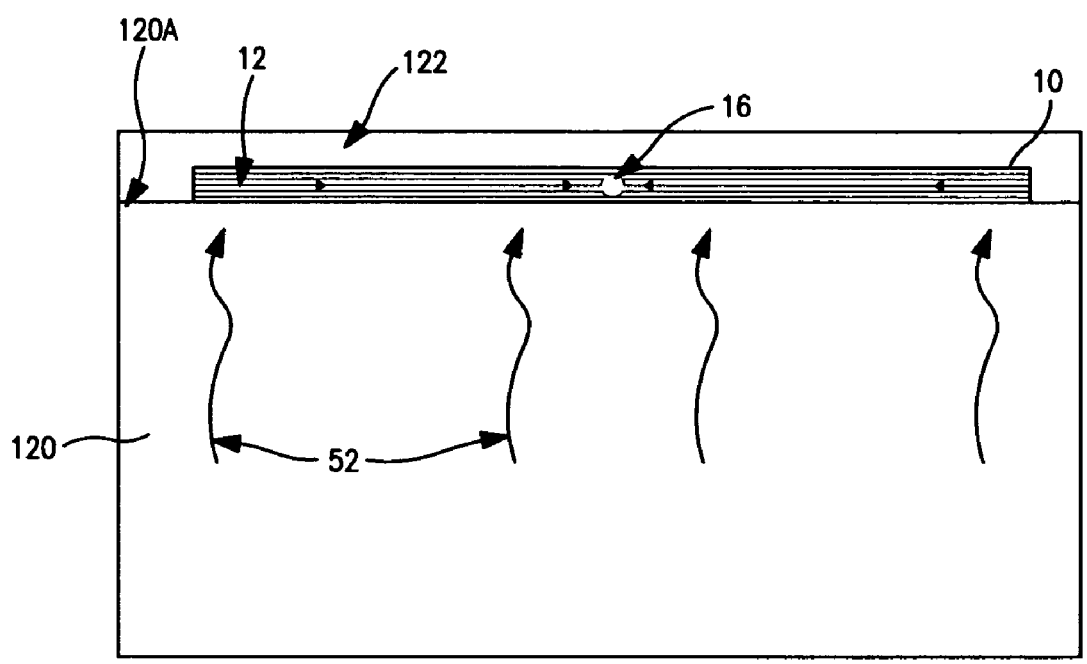
FIG. 5 is a schematic representation of a fluid injection and removal system 10 positioned on the surface 120A of a shallow contaminated area 120 or waste for collecting and removing subsurface gases and vapors 52.

Once the fluid injection or removal system 10 is installed, the pump 18 is operated to inject or remove fluid into the perforated pipe 16 or the suction or vacuum driven system is activated to remove fluid from the perforated pipe 16. Where the fluid injection or removal system 10 is used to inject fluid 50 or 52 into the solid waste 100 or contaminated area 120, the fluid 50 or 52 is injected under a positive pressure. In one (1) embodiment, the fluid 50 is water. In one (1) embodiment, the fluid 50 is a waste treatment liquid. In one (1) embodiment, the fluid includes surfactants. In one (1) embodiment, the fluid 50 is recirculated leachate which has been treated and filtered. In one (1) embodiment, the fluid is a liquid which is injected at a liquid injection rate Q of between about 0.9 $m^3$/hr/m and 3.6 $m^3$/hr/m per linear meter length of the perforated pipe 16. In one (1) embodiment, the injection is continuous. In another embodiment, the injection is conducted in on/off cycles. In the embodiment where the fluid injection and removal system 10 is used to inject fluids into the solid waste 100 or contaminated soil 124, the fluid exits the perforated pipe 16 and travels through the permeable layer 12. The fluid 50 or 52 moves into the solid waste 100 or contaminated soil 124 adjacent to or below the permeable layer 12 after the fluid 50 or 52 moves through the permeable layer 12. In one embodiment, the fluid 50 or 52 does not exit the permeable layer 12 into the surrounding solid waste 100 or contaminated soil 124 until the permeable layer 12 is at least partially saturated with the fluid 50 or 52. The distance the fluid 50 or 52 moves in the permeable layer 12 away from the perforated pipe 16 before exiting the permeable layer 12 and moving into the adjacent waste 100 or contaminated soil 124 depends on many factors including the hydraulic conductivity of the waste or underlying contaminated soil, the hydraulic conductivity of the permeable layer 12, the injection rate Q and the dosing frequency. The greater hydraulic conductivity of the permeable layer 12 allows the fluid 50 or 52 to be distributed essentially throughout the permeable layer 12 before the fluid 50 or 52 moves from the permeable layer 12 to the adjacent solid waste 100 or contaminated soil 124. As the injected fluid infiltrates the permeable layer 12, the high hydraulic conductivity of the permeable layer 12 allows preferential travel of the injected fluids within the permeable layer 12 and wetting of the underlying waste 100 or soil 124. The distribution of the fluid essentially throughout the length and width of the permeable layer 12 allows for a uniform distribution of the fluid into the waste or ground below the permeable layer 12 throughout the entire area of the permeable layer 12. Uniform distribution of the fluid in a landfill 110 reduces uneven settlement of the solid waste 100 in the landfill 110 and increases the gas generation potential of the landfill 110. In another embodiment, where the fluid injection and removal system 10 is used as a gas removal system to remove gases 52 from the landfill 110 or contaminated area 120, the suction or vacuum driven system is attached to the end of the perforated pipe 16 opposite the capped end. The system 10 is activated to collect and remove any gases or vapors 52 that have moved into the perforated pipe 16 from the solid waste 100 or contaminated ground 124 (FIG. 5). Permeable layers 12 can be used independently or in conjunction with vertical wells or horizontal trenches to efficiently collect and gases or vapors 52. Use of permeable layers 12 will cause significant reduction in gases or vapor emissions from the ground surface and allow construction of buildings for industrial applications at such sites.

To use the leachate recirculation system 130 in a municipal solid waste landfill 110, the leachate collection system 30 is positioned at the bottom of the landfill 110. When the leachate collection system 30 includes a liner 36 such as in a landfill cell, the liner 36 is first positioned on the bottom of the landfill 110 and then the drainage material 34 and the perforated collection pipe 32 are positioned on the liner 36 (FIG. 1A). The solid waste 100 is then positioned over the leachate collection system 30. The fluid injection and removal system 10 is positioned in the solid waste 100 above the leachate collection system 30 so that the leachate collection system 30 is spaced below and apart from the fluid injection and removal system 10. The spacing or distance, D, between the fluid injection and removal system 10 and the leachate collection system 30 depends on site-specific factors (FIG. 1A). The greater the distance, the better the decomposition of the landfill 110 since the leachate is stored in the waste as it moves to the leachate collection system 30. In one (1) embodiment, the fluid injection and removal system 10 is spaced apart from the leachate collection system 30 at least about 3.0 m (10 ft). In another embodiment, the distance, D, between the fluid injection and removal system 10 is approximately 3 m (10 ft). Additional solid waste 102 can be positioned on the fluid injection and removal system 10 on a side opposite the leachate collection system 30. Once the leachate recirculation system 130 is installed, the hydraulic pump 18 is activated to move the liquid 50 into the perforated pipe 16. In one (1) embodiment, the liquid 50 is water. In one embodiment, the liquid 50 is a waste treatment liquid. In one (1) embodiment, the liquid 50 is recirculated leachate. The liquid 50 is moved into the perforated pipe 16 under positive pressure and at an injection rate similar to the injection rate of other liquids 50 using the fluid injection and removal system 10. The liquid 50 exits the perforated pipe 16 and enters the permeable layer 12 and is distributed through the permeable layer 12. The liquid 50 exits the permeable layer 12 and enters the solid waste 100. The rate of drainage of the injected liquid 50 through the permeable layer 12 into the solid waste 100 is a function of the hydraulic conductivity of the permeable layer 12 and the underlying solid waste 100 and of the volume and frequency of the liquid injection or dosing. The liquid 50 moves through the solid waste 100 toward the leachate collection system 30 due to gravity. The liquid or leachate 50 enters the drainage material 34 of the leachate collection system 30 and enters the collection pipe 32 of the leachate collection system 30. The suction or gravity driven system is activated to remove the liquid or leachate 50 collected by the leachate collection system 30. The leachate can be filtered and treated and stored in a storage container 26 to be reused in the leachate recirculation system 130. It is understood that the leachate could include solid particles and gases.

In one (1) embodiment, sensors 40 are mounted in the permeable layer 12 adjacent to the second surface 12B of the permeable layer 12 (FIG. 3). Permeable layers 12 made up of granular materials provide an ideal platform to embed sensors 40. The permeable layer 12 having the sensors 40 allows for a quick and efficient way to mount sensors 40 in the solid waste 100 at different levels of the landfill 110. In one (1) embodiment, the sensors 40 include impedance moisture content sensors 42, time domain reflectometry moisture content sensors 44, vibrating wire pressure transducers in the form of piezometers 46 and thermocouple and thermistor temperature sensors 48. The sensors 40 monitor physical, chemical, or biological parameters associated with the migration of injected liquid, gases or leachate and the pressure and temperature changes in the permeable layer 12. Different sensors 40 can be operated at different times which allows for more extensive data. Data collected from the sensors 40 enables the estimation of hydraulic and thermal properties and the change in the hydraulic and thermal properties of the solid waste 100 or contaminated soil 124 directly below the permeable layer 12 to be determined or estimated. The sensors 40 enable a user to calculate the optimal operating temperature for landfills 110 or optimal liquid or fluid injection or recirculation rate. Using the data from these sensors 40 allows for more efficient design, construction and operation of landfills 110.

In one (1) embodiment, a sensing and monitoring system can be used to monitor the leachate injection rate and pressure and the rate of travel of injected leachate in the permeable layer 12. Such sensing and monitoring systems can be used to manipulate the leachate injection rate (or pressure) to compensate for any differential settlement in the permeable layer 12.

EXAMPLES

Figure 6:
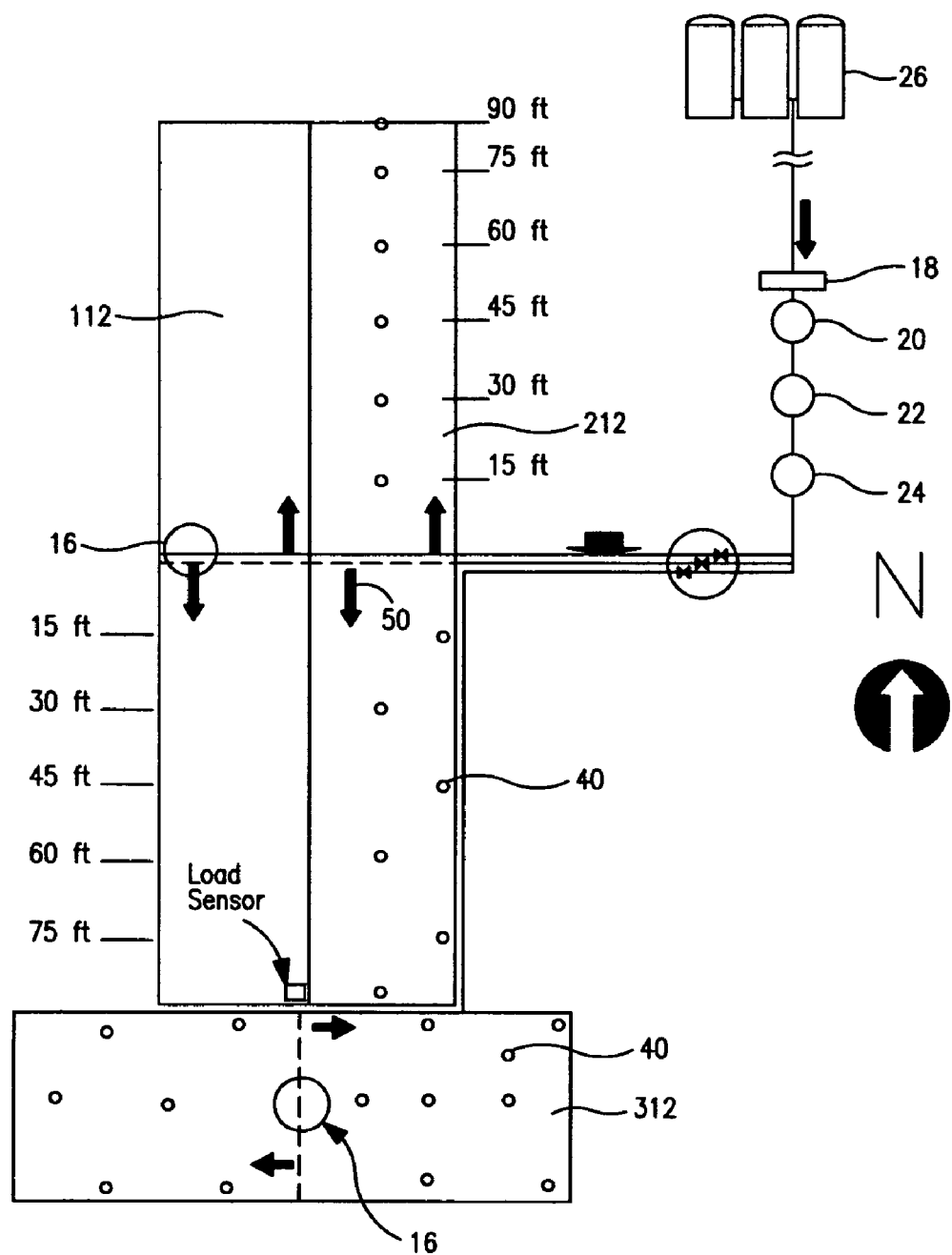
FIG. 6 is a schematic plan view of the fluid injection and removal systems 10 of the Examples.

Three field-scale leachate recirculation permeable layers were constructed at an active municipal solid waste landfill. The landfill generates on average 45 m$^3$ of leachate per day at the McGill Landfill in Jackson, Mich. In Example 1, the permeable layer 112 was made up of crushed recycled glass. In Example 2, the permeable layer 212 was constructed of shredded tires. In Example 3, the permeable layer 312 was a geocomposite drainage layer (FIG. 6). The first two (2) permeable layers 112 and 212 had a length of about 55 m (180 ft) and a width of about 9 m (30 ft). The third permeable layer 312 had a length of about 34 m (110 ft) and a width of about 12 m (40 ft) wide. A perforated leachate injection pipe having a length of about 9 m (30 ft) and an inner diameter of 0.076 m (3 inches) was installed at the center of each of the permeable layers 112, 212 and 312 in Examples 1 and 2 to inject leachate. The length of the pipe 16 was about 12 m (40 ft) for the permeable layer 312 in Example 3. One (1) end of the perforated pipe was capped and the other end was connected to a hydraulic pump. The hydraulic pump was a high head/high discharge flow pump which was able to pump up to 140 gpm at 100 ft of head. The hydraulic pump was connected to three (3) interconnected leachate storage tanks having a total storage capacity equal to approximately 115 m$^3$. A leachate flow control valve, a digital pressure gauge, and a magnetic flow gauge were positioned in the leachate injection perforated pipe to control and monitor the pressure head and flow rate of the injected leachate.

The monitoring system included 30 moisture content sensors to detect the arrival of the leachate front and to monitor water balance of the leachate flow, 4 pressure head sensors (piezometers), 10 thermocouples to measure the temperature of the leachate and the permeable layers. A load sensor was also installed to measure the vertical stress from the waste placed on the permeable layers. A pressure gauge was installed to measure leachate injection pressure and a magnetic flow meter was used to measure leachate flux. A weather station or meteorological data sensors were used to measure precipitation, air temperature, and barometric pressure.

Sensors were also installed to determine the physical characteristics, such as the hydraulic and thermal conductivities, or the change in characteristics of the solid waste. In Examples 1 and 2, the sensors were installed in the permeable layer 112 and 212 adjacent the second or bottom surface of the permeable layer 112 and 212. In Example 3 where the permeable layer 312 was a geocomposite drainage layer, the sensors were installed in the solid waste immediately below the permeable layer. The sensors included 30 moisture content sensors, 4 piezometers; and 10 thermocouples. The sensors were used to record the movement or migration of liquid or leachate and to calculate the liquid or leachate recirculation efficiency of the leachate recirculation system. A load cell was also placed in the permeable layer or solid waste adjacent the permeable layer. The load cell monitored the load on the permeable layer due to solid waste placed on the permeable layer. A profiler conduit was also used to monitor settlement of the permeable layer. A digital pressure gauge and a magnetic flow meter were installed adjacent the perforated pipe to monitor the liquid or leachate head and flow. Meteorological data sensors were also used.

The sensors were connected to an on-site Campbell CR10X datalogger and 3 multiplexers to continuously log data. The frequency of data logging was programmed at various intervals from once every minute to once every day to capture the measurements.

Leachate recirculation trials were conducted on each of the three permeable layers at leachate injection rates ranging from 15 to 140 gallons per minute (gpm) (3.4 to 32 m$^3$/hr). A leachate flow control valve was installed in the perforated pipe to control the leachate head and flow rate. The net injection pressure head ranged from about 0.6 to 4 m (2 to 13 ft). The migration of leachate in the permeable layers 112, 212 and 312 was monitored from the moisture contents measured as electrical impedance, leachate temperature, and pressure head values measured by the sensors embedded in or immediately below the permeable layer. The data established the relationship between the injection head and travel distance and showed that leachate travels horizontally in a short period of time in a material that has hydraulic conductivity greater than the waste in the landfill.

The data collected from the sensors indicated that in both permeable layers, the leachate traveled across the entire length of the permeable layer. The amount of time required for the leachate to travel across the permeable layer varied from 10 minutes to over 90 minutes depending upon the leachate flow rate. The collected data proved that, in landfills operated as bioreactors, a horizontal permeable layer made up of a high conductivity material is cost-effective and hydraulically efficient for recirculation of leachate. The data may also be used to measure bulk in situ hydraulic conductivity of waste as an indicator of state of degradation of waste.

The location of the moisture sensor is identified by the distance of the sensor from the perforated leachate injection pipe installed at the center of the permeable layer (FIGS. 2 and 3). All moisture sensors indicated that if leachate injection is paused, the water content of the permeable layers decrease. Thus, the permeable layers can be used to collect landfill gas without sucking in liquids from the landfill.

Based on the field data, leachate recirculation permeable layers made of inert or reactive hydraulically permeable materials having a hydraulic conductivity or hydraulic transmissivity greater than the hydraulic conductivity of the underlying and overlying material (waste) can be used to recirculate leachate or liquids in landfills. The data also showed that permeable layers distribute liquids more uniformly compared to conventional trench or vertical well methods.

Example 1

In Example 1, where the permeable layer 112 was constructed of recycled, crushed glass, the permeable layer 112 had a thickness of about 0.15 m (0.5 ft).

The crushed recycled glass had an average particle diameter, $D_{50}$ of approximately 10 mm (0.394 inches). The permeable layer 112 had a hydraulic conductivity equal to $3 \times 10^{-2}$ m/s. The fluid injection and removal system was constructed by first leveling the waste surface. Next, a non-woven lower geotextiles fabric was laid on the waste surface. Below the lower geotextiles fabric, from top to bottom, was a layer of silty soil (loess) used as a daily soil cover having a thickness or depth of about 50 mm (2 inches), a layer of municipal solid waste having a thickness or depth of about 20 m (66 ft) and a leachate collection and lining system. A layer of crushed glass having a thickness or depth of about 0.15 m (0.49 ft) was placed on the geotextiles to form the permeable layer 112. An upper geotextiles fabric was then placed above the crushed glass. Additional waste having a thickness or depth of about 3 m (10 ft) was placed on the upper geotextiles fabric. A high density polyethylene (HDPE) leachate injection perforated pipe having a length of about 9 m (30 ft) was installed at the center of the permeable layer 112, parallel to the width, across the short side of the permeable layer 112.

The sensors for the monitoring system were installed in the crushed glass forming the permeable layer 112. The sensors were used to monitor the travel of injected leachate in the permeable layer 112. No sensors were installed in the underlying waste. The data logger was programmed to take readings at 1 to 5 minutes frequency to allow relatively precise monitoring of the injected leachate and the pressure head of the injected leachate in the permeable layer $h_p$. For a period of about eight (8) months, about 3,200 m$^3$ of leachate was injected in the permeable layer corresponding to approximately 90 leachate recirculation events at leachate injection rates ranging from approximately 1.1 to 3.6 m$^3$/hour per meter length of the embedded injected perforated pipe. The maximum leachate injection rate the pump at the site could deliver for the total head that exists for the system was approximately 3.6 m$^3$/hr/m.

Figure 22:
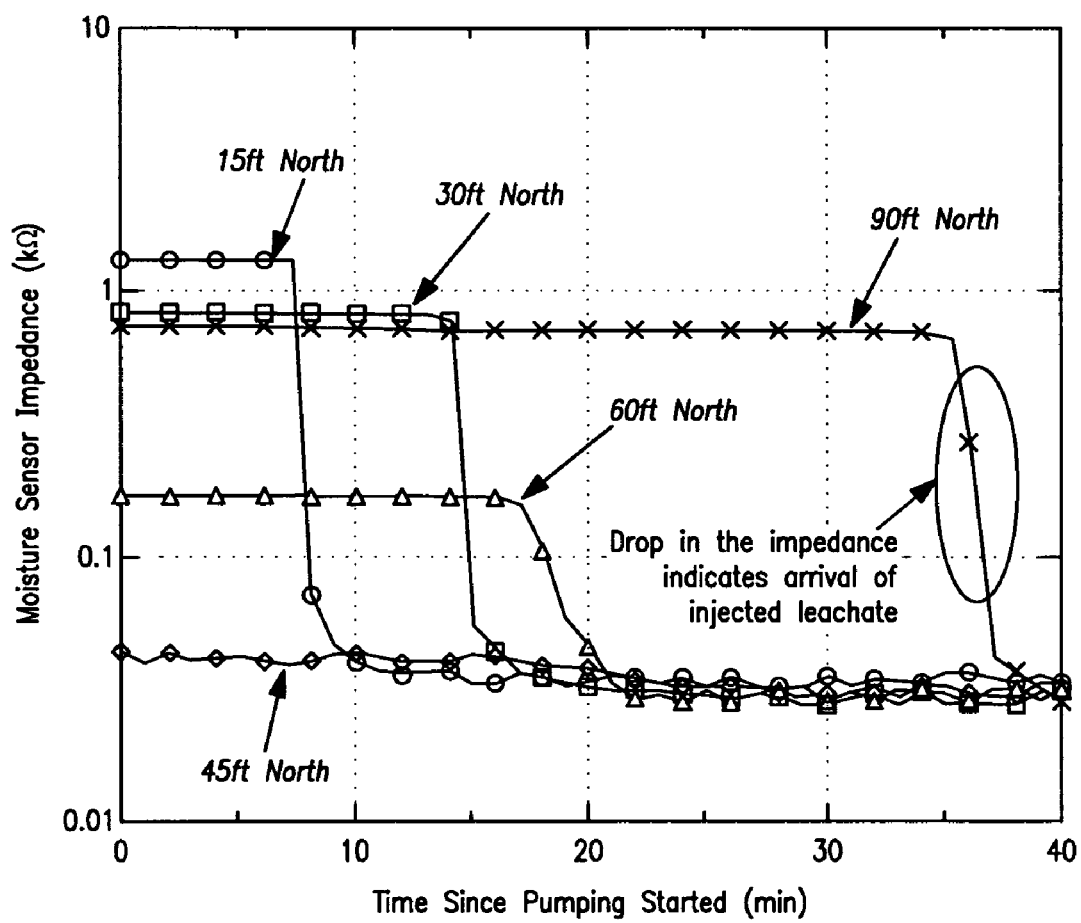
FIG. 22 is a plot indicating the arrival of leachate injected at a leachate injection rate, Q, of 140 gpm as shown by a decrease in the impedance of the moisture sensors 42 for Example 1.
Figure 23:
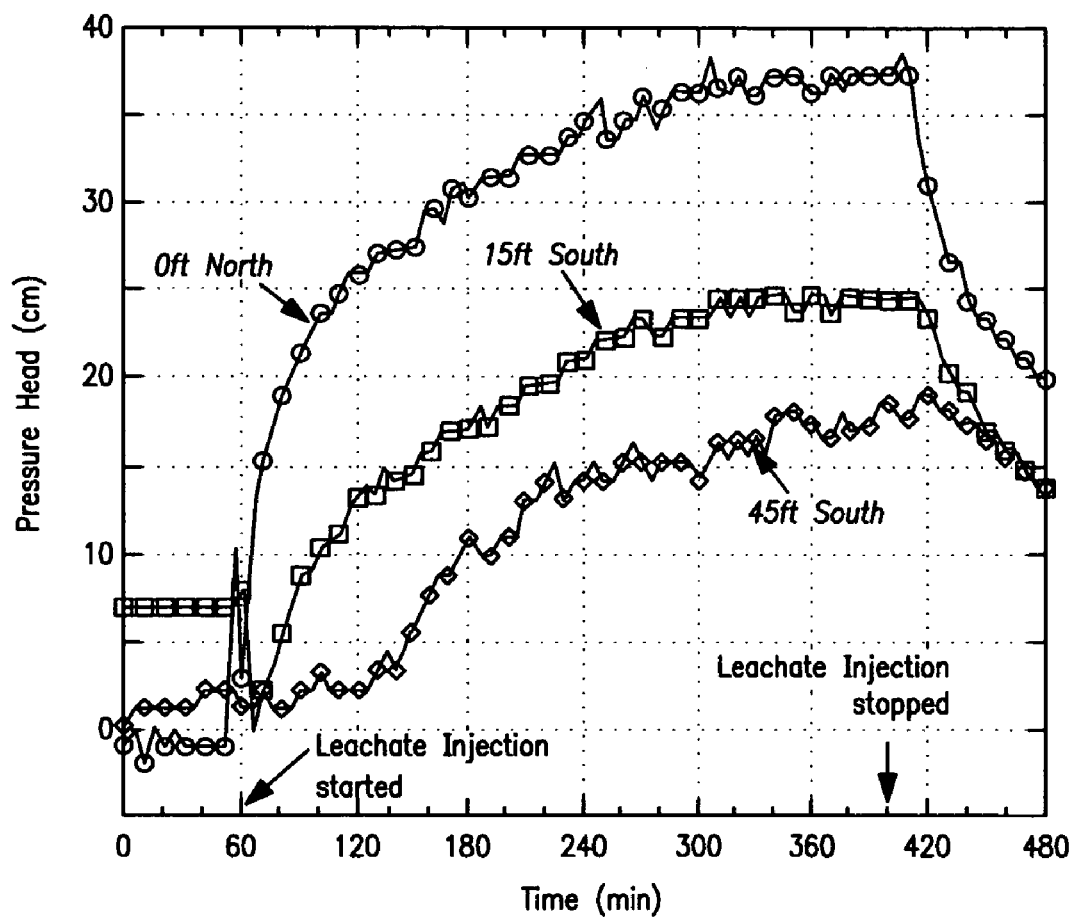
FIG. 23 is a plot indicating the arrival of leachate injected at a leachate injection rate, Q, of 45 gpm as shown by an increase in the pressure head $h_p$ in the permeable layer 112 as measured by piezometer sensors 46 for Example 1.

The data from the impedance-based moisture sensors in response to the leachate injection in the permeable layer showed that for a leachate injection rate of approximately 3.5 m$^3$/hr/m, leachate traveled laterally in the glass layer and reached the sensor located about 5 m (15 ft) to the north of the injection pipe in about 7 minutes and reached about 27 m (90 ft) in about 35 minutes (FIG. 22). The suffix "north" or "south" for the sensor location indicates which side of the perforated pipe the sensor is located. The data also showed that when the leachate injection rate was reduced to approximately 1.1 m$^3$/hr/m), the leachate traveled laterally in the glass layer and reached the sensors located about 5 m (15 ft) to the north of the injection pipe in about 20 minutes and reached the sensors located at about 32 m (105 ft) in about 35 minutes. The data shows that leachate travel time in glass layer is linearly proportional to the leachate injection rate. The liquid pressure head data measured by the 3 piezometer sensors, installed in the glass layer on the south side, showed that liquid pressure in the glass layer increased when the leachate injection was started (FIG. 23). The pressure gradually reduced back to the original value once the leachate injection was stopped. The data from the sensors showed that the liquid pressure in the glass layer increased and the temperature of the glass layer decreased when the leachate injection was started. The temperature of the leachate injected is less than the temperature of the permeable layer before leachate injection was started.

Example 2

In Example 2, where the permeable layer 212 was constructed of shredded tires, the permeable layer 212 had an average thickness of about 0.5 m (1.6 ft). The perforated pipe was constructed of HDPE and was installed at the center of the permeable layer across the short side or width of the permeable layer and had a length of about 9 m (30 ft).

Figure 24:
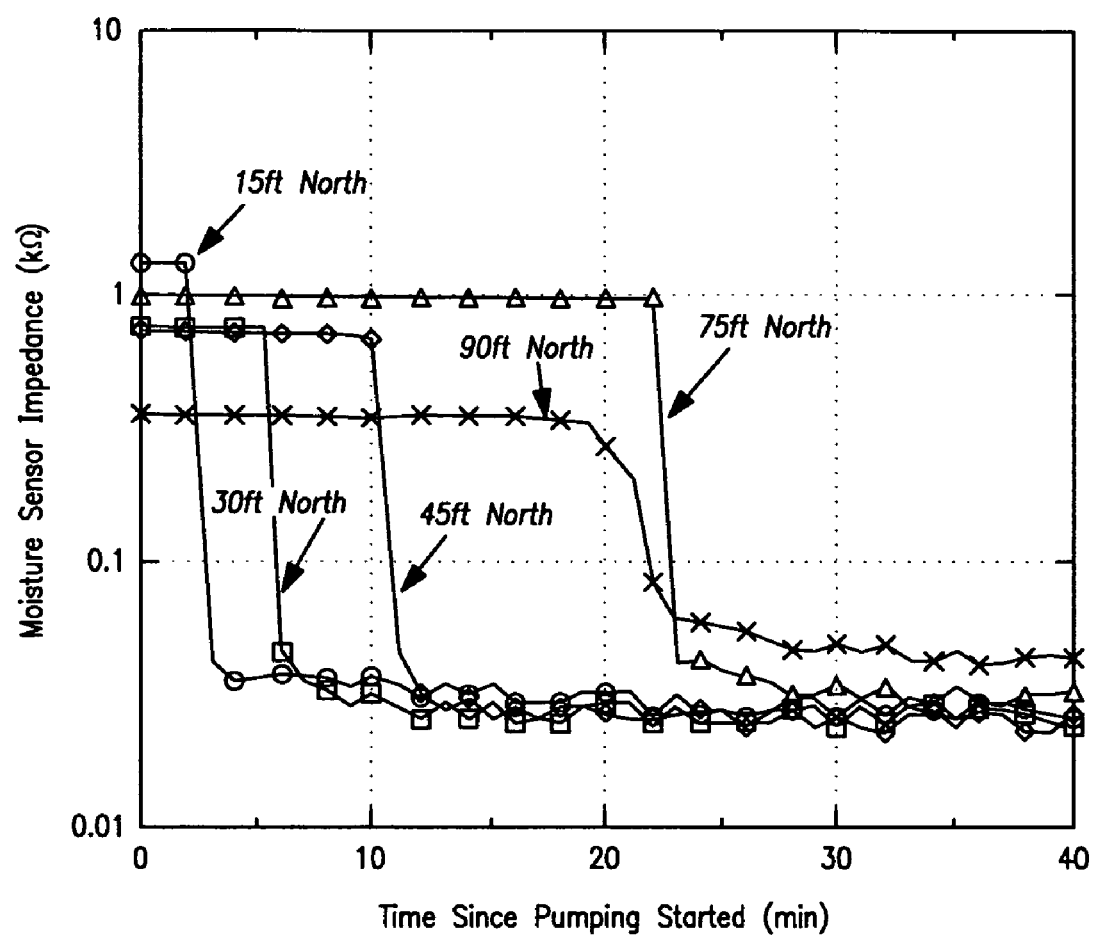
FIG. 24 is a plot indicating the arrival of leachate injected at a leachate injection rate, Q, of 140 gpm as shown by a decrease in the impedance of the moisture sensors 42 for Example 2.

The data showing the response of impedance-based moisture sensors to the leachate injection in the shredded tires layer, showed that for a leachate injection rate of approximately 3.5 m$^3$/hr/m, the leachate traveled laterally in the shredded tires layer and reached the sensor located at approximately 15 ft (4.57 m) to the north of the perforated pipe in about 2 to 3 minutes and reached the sensor located 23 to 27 m (75 to 90 ft) in about 20 to 25 minutes (FIG. 24). The data showed that for a leachate injection rate of 1.1 m$^3$/hr/m), leachate traveled laterally in the shredded tires layer and reached the sensors located at about 9 m (30 ft) to the north of the perforated pipe in about 280 minutes, reached the sensor located at about 14 m (45 ft) in about 60 to 70 minutes, and reached the sensors located at about 18 to 27 m (60 to 90 ft) in about 325 minutes. The data showed that the shredded tire layer is linearly proportional to the leachate injection rate. In the permeable layer constructed of shredded tires, due to the large size of tire shreds used, the flow within the shredded tire layer was not as uniform as in the glass layer. The sensors located farther from the leachate injection perforated pipe showed arrival of leachate earlier compared to sensors located near the perforated pipe.

Example 3

In Example 3, the permeable layer 312 was a geocomposite drainage layer to be used to recirculate leachate. Table 1 sets forth the key properties of the components of the geocomposite drainage layer.

TABLE 1

Physical Properties of the Geocomposite Drainage Layer

| Component | Upper Geotextile | Lower Geotextile | Geonet |
|---|---|---|---|
| Type | Non-Woven | Woven | — |
| Thickness (mm) (ASTM D 5199) | 2 | 0.5 | 5 |
| Mass per Unit Area (g/m$^2$) (ASTM D 5261) | 270 | 200 | — |
| Transmissivity$^a$ (cm$^2$/s) (ASTM D 4716-00) | — | — | 20 |
| Permittivity (s$^{-1}$) (ASTM D 4491) | 1.5 | 1.1 | — |
| Hydraulic Conductivity (cm/s) (ASTM D 4491) | 0.3 | 0.05 | — |

TABLE 1-continued

Physical Properties of the Geocomposite Drainage Layer

| Component | Upper Geotextile | Lower Geotextile | Geonet |
|---|---|---|---|
| Apparent Opening Size (mm) (ASTM D 4751) | 0.18 | 0.6 | ~12.5 |
| Percent Open Area (%) (CW- 02215) | — | 11 | 80 |

Note:
$^a$gradient of 0.1, normal load of 480 kPa, water (permanent) at 20° C., between steel plates for 15 minutes.

Before placing the geocomposite drainage layer, the surface of the landfill cell was essentially leveled. A topographic survey of the geocomposite drainage layer conducted after the placement of the geocomposite drainage layer indicated that the ground had an average slope for east to southeast of about 3.5%. The landfill cell below the geocomposite drainage layer included a first layer having an average thickness of 0.05 m (16 ft) and containing silty soil (loess) used as a daily cover. A second layer below the first layer had a thickness of about 20 m (66 ft) and included municipal solid waste. A third and final layer below the second layer included a leachate collection and lining system. The geocomposite drainage layer rolls were 4.6 m (15.1 ft) wide. The geocomposite drainage layer had a non-woven upper geotextile and a woven lower geotextile with the geonet spaced therebetween. The non-woven upper geotextile faced upward to prevent an intrusion of the waste into the geonet. The woven lower geotextile faced downward to minimize potential clogging due to the underlying silt layer. To create a geocomposite drainage layer having a width of 12 m (39 ft), three geocomposite drainage layer rolls were used with a 0.6 m (2.0 ft) overlap. In the overlap zone, the edges of the adjacent geonets were butted against each other and an overlap of about 0.6 m (2.0 ft) was used for the upper and lower geotextiles.

The perforated pipe was constructed of high density polyethylene (HDPE) and had a length of about 12 m (39 ft) and was installed at the center of the geocomposite drainage layer, parallel to the width (FIG. 2). The perforated pipe divided the geocomposite drainage layer into two almost identical segments, a first or eastern segment and a second or western segment.

In this Example, the moisture content, temperature and pressure sensors were embedded immediately below the geocomposite drainage layer in the solid waste. A total of 14 locations adjacent the geocomposite drainage layer were instrumented with impedance moisture content sensors, time domain reflectometry moisture content sensors, vibrating wire pressure transducers, and thermocouple and thermistor temperature sensors. The sensors were installed immediately below the geocomposite drainage layer (FIG. 3). Holes measuring approximately 0.300 m (1 ft) in diameter and having a depth of about 0.300 m (1 ft) where excavated in the silty soil layer and waste below the geocomposite drainage layer and the sensor(s) were placed in drainage backfill consisting of coarse sand or crushed glass. The drainage backfill had a diameter D$_{50}$ Of approximately equal to about 0.012 m (0.039 ft), and a hydraulic conductivity of approximately 1 cm/s (0.39 in/s).

The impedance moisture content sensors measured the electrical impedance R between two electrodes embedded in a sand pack having a diameter of about 50 mm (1.97 inches) (Gawande et al. 2003). The impedance of the sensor is inversely proportional to the moisture content of the sand or the material surrounding the sand. A thermocouple of type T was added to the impedance moisture content sensor to allow the measurement of temperature.

The time domain reflectometry moisture content sensor measured the surrounding medium's dielectric constant, which is directly related to the moisture content. The time domain reflectometry sensor had a length of about 685 mm (26.9 inches) and a diameter of about 0.019 m (0.062 ft).

The vibrating wire pressure transducer measured combined gas and liquid pressure. The pressure transducer was not vented and required correction for changes in the barometric pressure and temperature. A thermistor, attached to the pressure transducer, allowed measurement of the temperature to correct the measurement of the transducer. Unlike thermocouple sensors, thermistors measured the absolute temperature and did not require a reference temperature to make the measurements. The time domain reflectometry and impedance moisture content sensors were backfilled with crushed glass and submerged in saline solutions having electrical conductivity ranging from 5 to 10 mS/cm. In one (1) embodiment, the crushed glass had an average particle diameter $D_{50}$ of approximately 12 mm (0.47 inches). Potassium chloride was used as an electrolyte to adjust the electrical conductivity of the solutions. The range of electrical conductivity represented the range of the electrical conductivity of injected leachate in the field. At saturation, the time domain reflectometry readings ranged from 1230 to 1300 µA and the impedance readings ranged from 0.02 to 0.03 kΩ.

A first sensor location, E4.5 m, included an impedance moisture content sensor with a thermocouple, a time domain reflectometry moisture content sensor, and a vibrating wire piezometer with a thermistor (FIG. 2). The prefix of the location describes the location of the sensor with respect to the leachate injection pipe (e.g., NW, W, etc.) and the suffix represents the perpendicular distance from the leachate injection pipe (e.g., 4.5 m, 12 m, etc.) (FIG. 2). A second sensor location, E9 m, included an impedance moisture content sensor and a time domain reflectometry moisture content sensor. The use of different types of sensors at the same location allowed for calibration and for independent verification of the data measured among the sensors.

A vertical pressure sensor was installed immediately outside one edge of the geocomposite drainage layer to monitor the weight (or vertical stress) of waste placed on the geocomposite drainage layer. The vertical pressure sensor also contained a thermistor which monitored the temperature of the waste adjacent to the geocomposite drainage layer. Meteorological sensors including a rain gauge, an air temperature sensor, and a barometric pressure sensor were also installed at the site.

All sensors including the leachate flow gauge and pressure gauge were connected to a data logger located at the site. Most of the data was collected at a 5-minute frequency to allow for precise monitoring of the injected leachate.

During the 9 month monitoring period, about 1,800 m³ of leachate was recirculated in the geocomposite drainage layer corresponding to approximately 27 leachate recirculation events. The leachate injection rate, Q, ranged from about 0.9 m³ to about 2.6 m³ per hour per meter length of the perforated pipe (m³/hr/m). The control valve was used to regulate the injection rate (FIG. 2). The maximum leachate rate was approximately 2.6 m³/hr/m which corresponded to the maximum rate the pump at the site could deliver at the total head that existed for the system. During the monitoring period, the rain gauge recorded about 5 m (16.5 ft) of cumulative precipitation at the site.

After the geocomposite drainage layer was covered with about 2 m (6.6 ft) thick waste, leachate recirculation was started. The initial vertical stress recorded at the site was about 2 kPa. By the end of the test period, the vertical stress increased to about 20 kPa due to waste filling.

Figure 16:
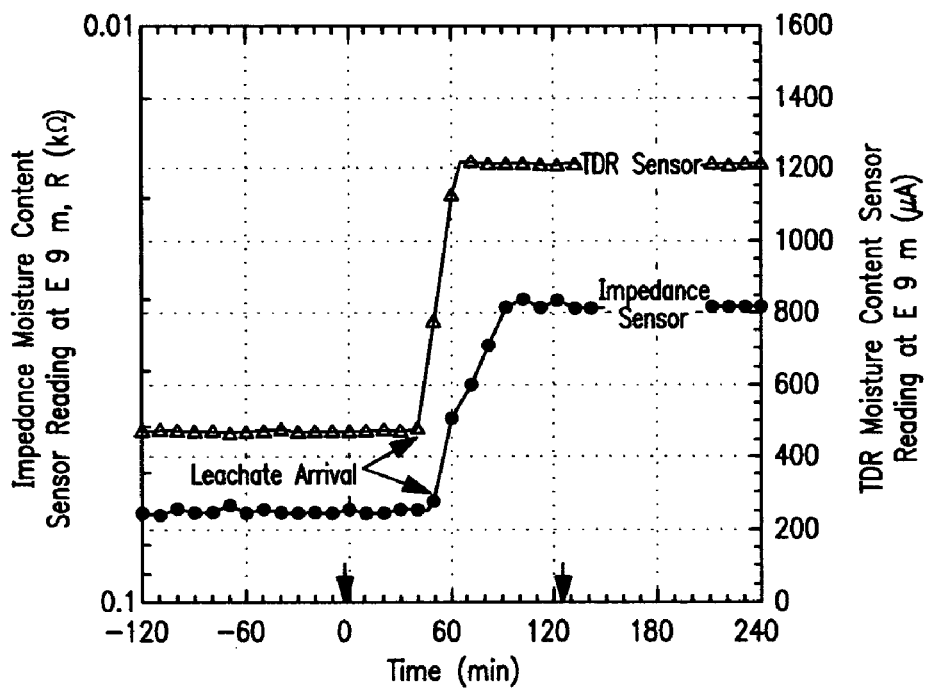
FIG. 16 is a plot verifying the response of the impedance moisture content sensor 42 using a time domain reflectometry moisture content sensor 44 for location E9 m in Example 3 overtime for an injection rate, Q, equal to 0.9 m$^3$/hr/m for a leachate injection event having a duration of 0 to 125 min.

At the second sensor location E9 m, data collected from the time domain reflectometry moisture content sensor was compared to data collected from the impedance moisture content sensor (FIG. 16). In FIG. 16, the negative values on the x-axis (−120 to 0) represent the time before the leachate injection started and the positive values on the x-axis (0 to 240) represent the time after the leachate injection began (FIG. 16). The two arrows on the x-axis correspond to when the leachate injection was started and turned off. About 40 minutes after the start of the leachate injection at the second sensor location, E9 m, the impedance started to drop and the time domain reflectometry reading started to increase. This indicates an arrival of the wetting front of the injected leachate. The impedance dropped from about 0.07 kΩ to 0.03 kΩ and then stabilized. Similarly, the time domain reflectometry reading increased from about 500 to 1,200 µA and then stabilized. The stabilized high readings of the time domain reflectometry and impedance moisture content sensors correspond to 100% saturation immediately below the geocomposite drainage layer. The data indicates temporary saturation of the geocomposite drainage layer at the second sensor location E9 m due to the leachate injection.

Figure 17:
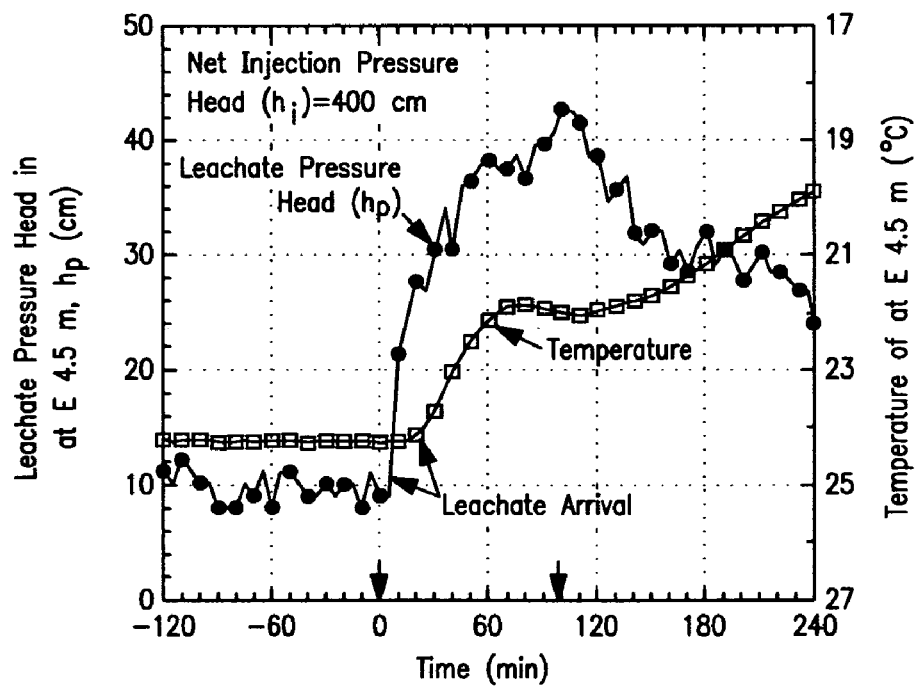
FIG. 17 is a plot showing the migration of leachate in the geocomposite drainage layer 14 of Example 3 as shown by the change in temperature and increase in pressure head, $h_p$, as measured by the sensors 40 at location E4.5 m (14.7 ft), for an injection rate, Q, of 2.6 m$^3$/hr/m, a net injection pressure head, $h_I$, of 400.0 cm (13.0 ft) overtime for a leachate injection event having a duration of 0 to 100 min.

At the first sensor location E4.5 m, before the start of the leachate injection, the temperature measured by the thermistor was about 24° C. and the pressure head measured by the transducer was about 10 cm (0.33 ft) (FIG. 17). Leachate was injected at a rate equal to about 2.6 m³/hr/m. The net leachate injection pressure head $h_i$ in the geocomposite drainage layer was estimated to be about 4 m (13.1 ft). The net leachate injection pressure head $h_i$ in the geocomposite drainage layer was estimated by subtracting head loss in the segment of the leachate injection pipe between the geocomposite drainage layer and the leachate pressure gauge located outside the geocomposite drainage layer. Moody's diagram (Moody 1944) was used to estimate the head loss. The leachate injection pressure was measured using a pressure gauge located approximately 40 m (131 ft) outside the geocomposite drainage layer (FIG. 2). The elevation of the leachate injection pressure measurement point was less than the average elevation of the geocomposite drainage layer by about 100 cm (3 ft).

The temperature of the injected leachate was around 19° C. About 10 to 15 minutes after the start of the leachate injection, in response to the arrival of the wetting front of the injected leachate, the temperature measured by the thermistor decreased and simultaneously the pressure head measured by the piezometer in the geocomposite drainage layer increased.

Readings or data from the sensors at the first and second sensor locations E4.5 m and E9 m were taken for a period of 6 hours which included a period of 120 minutes before the beginning of the start of the leachate injection. In one (1) trial, data from the sensors at the first sensor location E4.5 m, was taken for a leachate injection rate of 2.6 m³/hr/m for 100 minutes. In another trial, data from the sensors at the second sensor location E9 m was taken for a leachate injection rate of 0.9 m³/hr/m for 125 minutes. No precipitation was recorded during the period the data was collected for either trial. The response of the sensors was strictly due to the leachate injected in the geocomposite drainage layer during those periods. The collected data indicated that moisture content, temperature, and pressure head, when measured simultaneously, can be used to monitor the migration of injected leachate in or immediately below the permeable layer.

Figure 18A:
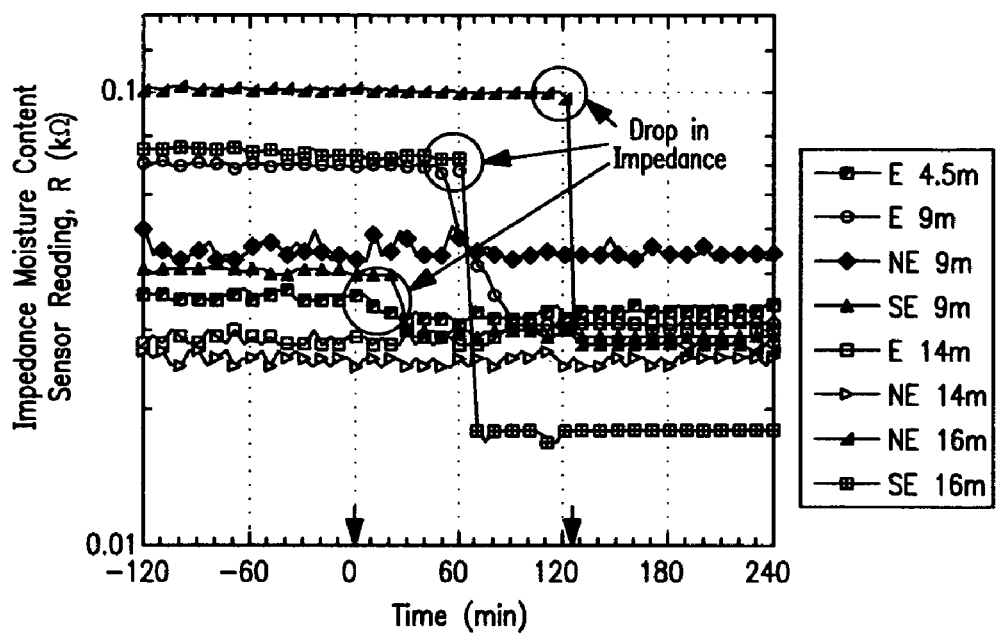
FIG. 18A is a plot of the response of the impedance moisture content sensors 42 in Example 3 at various sensor locations in the eastern portion of the permeable layer 12 for a leachate injection event having a duration of 0 to 125 minutes at a leachate injection rate equal to 0.9 m$^3$/hr/m.
Figure 18B:
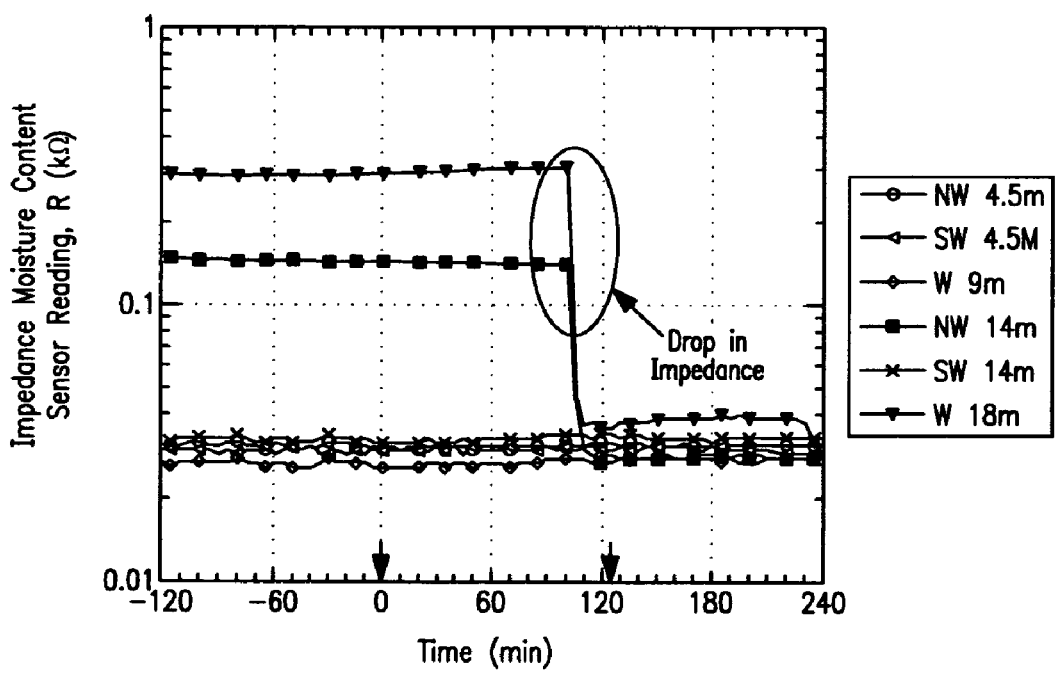
FIG. 18B is a plot of the response of the impedance moisture content sensors 42 in Example 3 at various sensor locations in the western portion of the permeable layer 12 for a leachate injection event having a duration of 0 to 125 minutes at a leachate injection rate equal to 0.9 m$^3$/hr/m.

Data from the impedance moisture content sensors located in the two segments of the geocomposite drainage layer was collected for leachate injection events corresponding to a leachate injection rate Q equal approximately to 0.9 m³/hr/m. The data showed that the impedance moisture content sensors that were initially, partially saturated, experienced a decrease in impedance as the injected leachate reached the location of the sensor. However, those sensors that were initially completely saturated did not show any decrease in impedance. The response of the impedance moisture content sensors to a leachate injection event where about 20 m³ of leachate was injected in the geocomposite drainage layer over a 125 minute duration was recorded (FIGS. 18A and 18B). The injected leachate in the first or eastern segment of the geocomposite drainage layer reached the impedance moisture content sensor at the first sensor location E4.5 m about 10 minutes after the start of the leachate injection and reached the impedance moisture content sensor at the second sensor location, E9 m, about 50 minutes after the start of the leachate injection. The injected leachate reached the impedance moisture content sensor at a third sensor location, SE9 m about 20 minutes after the start of the leachate injection, reached the impedance moisture content sensor at a fourth sensor location SE16 m (52.5 ft) about 60 minutes after the start of the leachate injection, and reached the impedance moisture content sensor at a fifth sensor location NE16 m within 120 minutes after the start of the leachate injection (FIG. 18A). The injected leachate in the second or western segment of the geocomposite drainage layer reached both the impedance moisture content sensors at two locations NW14 m and W18 m about 100 minutes after the start of the leachate injection (FIG. 18B). The rate of travel of injected leachate in the two segments of the geocomposite drainage layer was not uniform. The leachate did reach the sensors located at the farthest locations SE16 m, NE16 m, and W18 m from the perforated pipe in both segments of the geocomposite drainage layer.

Figure 19:
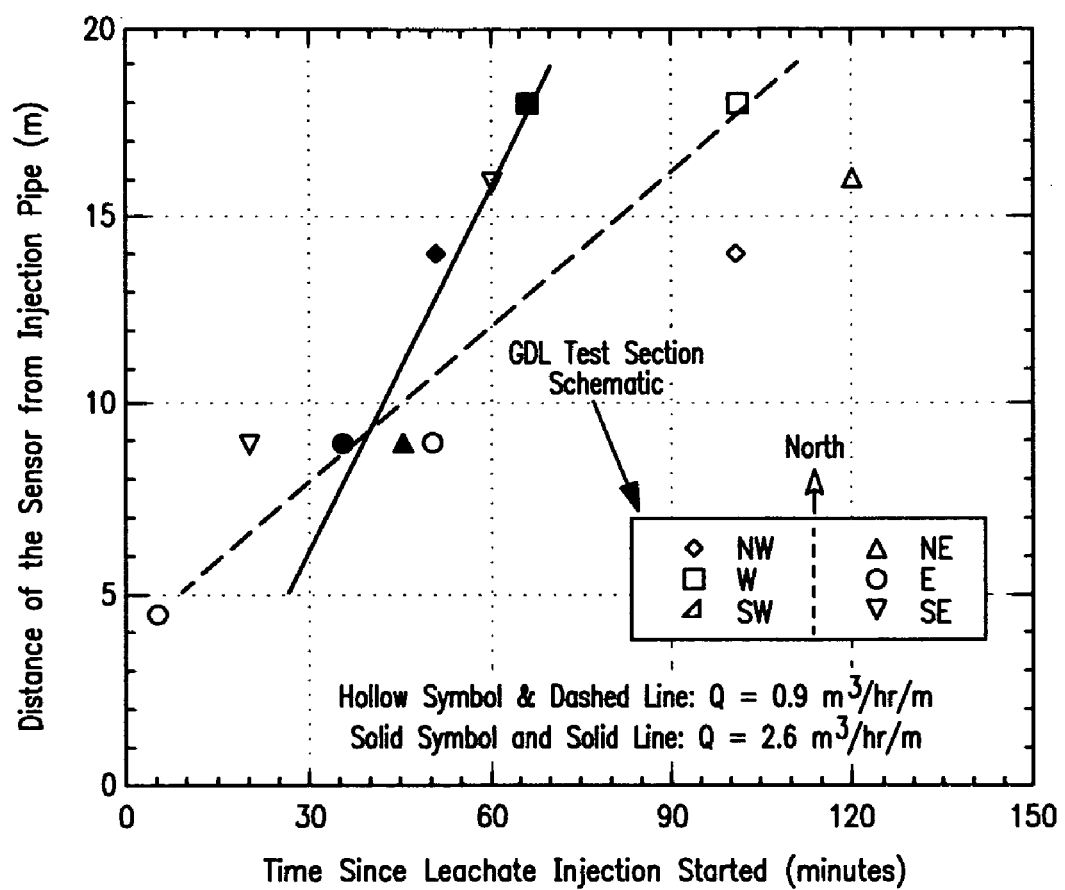
FIG. 19 is a plot of the effect of the leachate injection rate on the rate of travel of leachate in the permeable layer 12 for leachate injection events corresponding to injection rates, Q, equal to 0.9 and 2.6 m$^3$/hr/m for Example 3.

The arrival times of injected leachate at the various locations of the sensors in the two segments of the geocomposite drainage layer was recorded for leachate injection rates Q equal to about 0.9 and about 2.6 m³/hr/m (FIG. 19). The arrival time was determined by the response of impedance moisture content sensors, located in the two segments of the geocomposite drainage layer, to the arrival of injected leachate.

Moisture content sensors that were initially saturated were not able to record the migration of injected leachate. Only sensors that were initially, partially saturated responded to the migration of injected leachate. To ease the observation of the response of sensors, sensors located in the same direction (e.g., NE, E, SE, etc.) were clustered and assigned the same symbol. The arrival times for leachate injection events at leachate injection rate Q equal to about 0.9 and about 2.6 m³/hr/m were recorded. The rate of travel of the injected leachate was greater for the higher leachate injection rate Q (FIG. 19). The average rate of travel of injected leachate for leachate injection rates Q equal to 0.9 and 2.6 m³/hr/m, were also recorded (FIG. 19). The data indicated an earlier arrival of injected leachate for the higher leachate injection rate Q. For a leachate injection rate Q equal to about 0.9 m³/hr/m, the injected leachate did not travel uniformly within the two segments of the geocomposite drainage layer. For a leachate injection rate Q equal to approximately 2.6 m³/hr/m, the travel of injected leachate was more uniform.

Based on the arrival time of injected leachate at a given sensor, the injected leachate traveled at an average rate of 5 to 10 m/hr (16.4 to 32.8 ft/hr) in the geocomposite drainage layer for a leachate injection rate Q equal to about 0.9 m³/hr/m and at an average rate of 12 to 18 m/hr (39.4 to 59.0 ft/hr) for a leachate injection rate Q equal to about 2.6 m³/hr/m. The rate of travel of injected leachate for a given leachate injection rate was not uniform across the geocomposite drainage layer due to preferential flow in the geocomposite drainage layer, wrinkles formed in the geocomposite drainage layer during installation, spatial variation of the hydraulic conductivity and moisture content of the underlying waste, and the slight slope of approximately 3.5% of the waste surface. Wrinkles formed in the geocomposite drainage layer as a result of the unevenness of the waste surface on which the geocomposite drainage layer was laid and thermal stresses induced from a few days of sun exposure before the geocomposite drainage layer was covered with waste.

Potential clogging of the geotextiles in the geocomposite drainage layer is one of the key operational concerns for permeable layer made of geocomposite drainage layer. If the geocomposite drainage layer partially clogs, the injection head must be increased to maintain the leachate injection rate. As the leachate injection head increases, the liquid pressure head in the geocomposite drainage layer and its immediate vicinity also increases.

Figure 20:
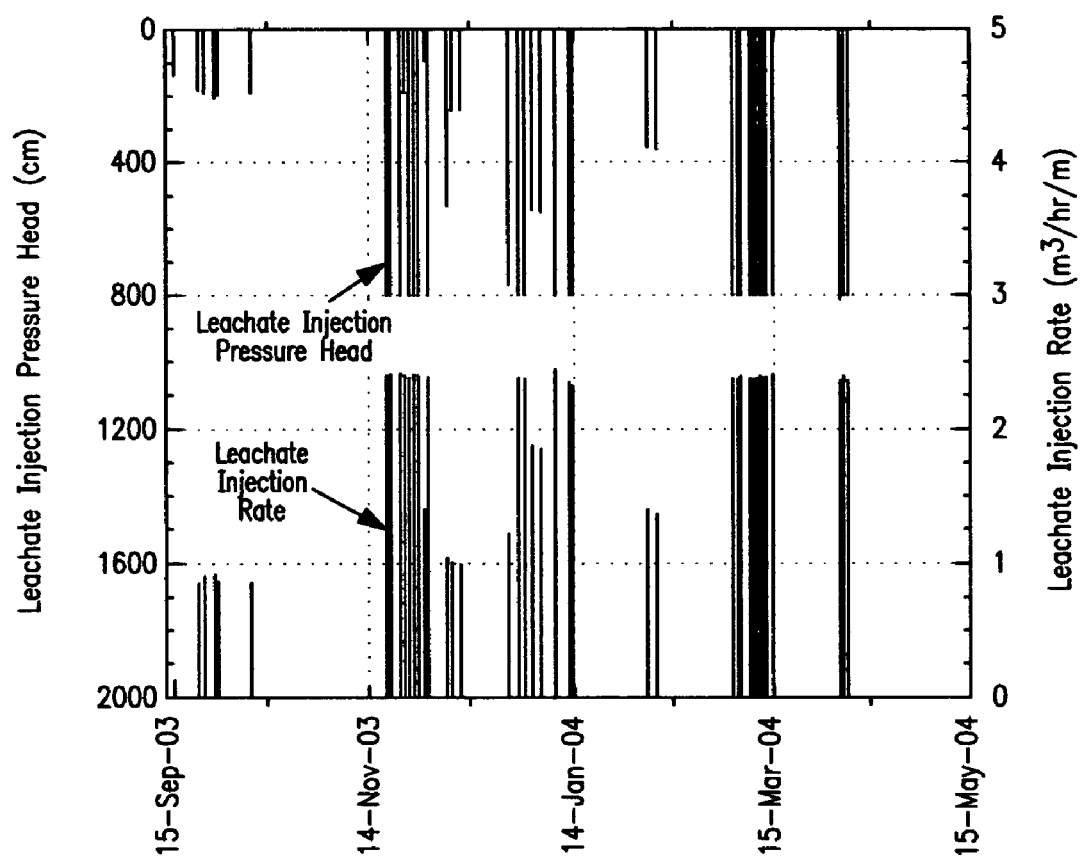
FIG. 20 is a graph of the leachate injection pressure head and the leachate injection rate over time measured at the site for Example 3.

For leachate injection rates equal to about 0.9, 1.4, and 2.6 m³/hr/m, the leachate injection pressures were about 200, 400, and 800 cm (78.7, 157.5, 314.9 inches), respectively. For a given injection rate, leachate injection pressure readings were constant and did not increase throughout the monitoring period (FIG. 20). Total hydraulic friction loss in the perforated pipe having a non-perforated length of about 40 m (131 ft) and perforated length equal to about 12 m (39 ft) long was estimated using Moody's diagram. For leachate injection rate ranging from about 0.9 to 2.6 m³/hr/m, the total friction loss ranged from about 100 to 300 cm (39 to 118 inches). Thus, the net leachate injection pressures ($h_i$) ranged from about 50 to 400 cm (20 to 158 inches).

Figure 21:
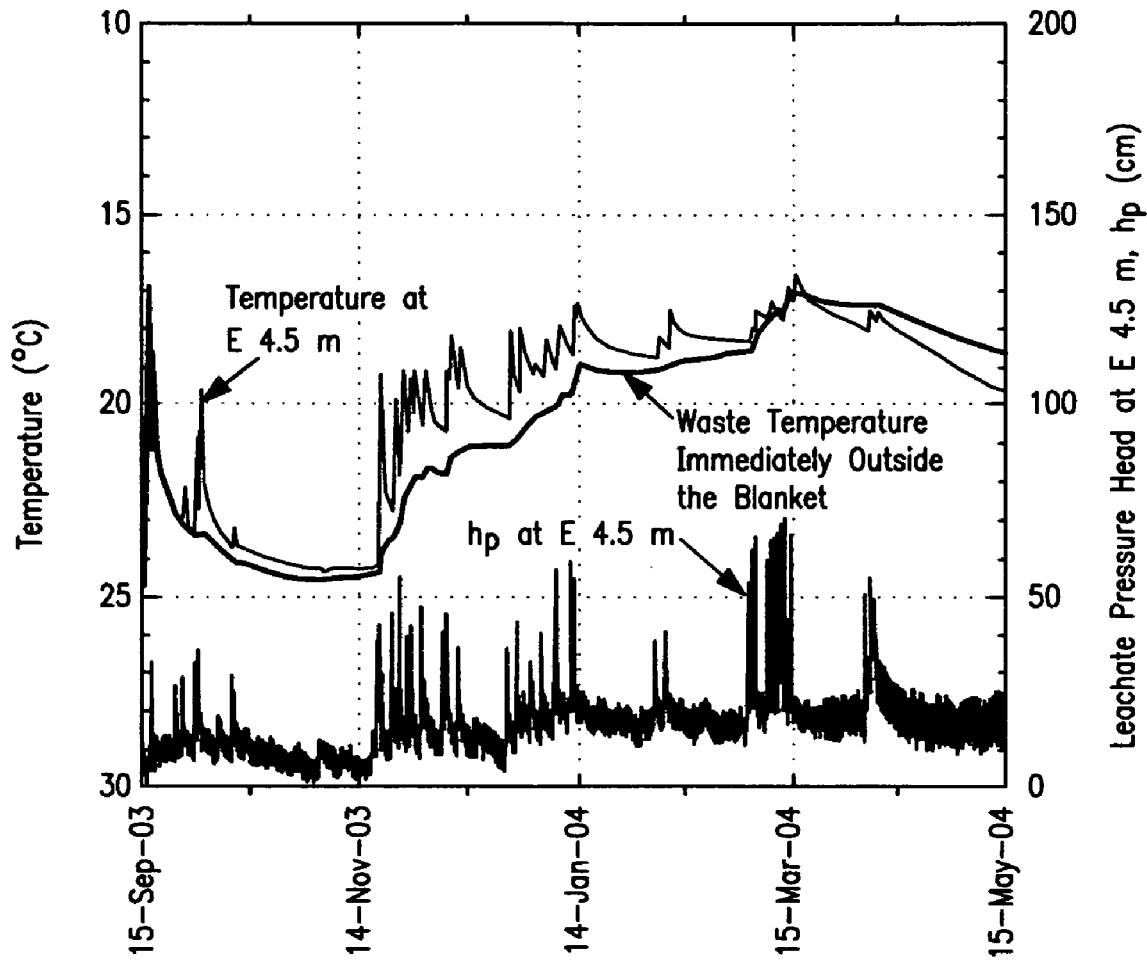
FIG. 21 is a graph of the leachate pressure heads and the temperatures within the permeable layer 12 and the waste temperature outside the permeable layer 12 over time measured at the site for Example 3.

For each leachate injection event, both the pressure transducer and the thermistor located at the first sensor location E4.5 m responded to the arrival of the injected leachate (FIG. 21). The pressure transducer recorded an increase in leachate pressure head as the pore water pressure increased due to the arrival of injected leachate. The increase in the pressure head gradually dissipated after the leachate injection was stopped. A pressure head $h_p$ with a magnitude of about 30 cm (12 inches) was recorded for a leachate injection rate of about 0.9 m³/hr/m. A pressure head with a magnitude of about 80 cm (32 inches) was recorded for a leachate injection rate of about 2.6 m³/hr/m (FIG. 21).

A comparison of the leachate injection pressure and the leachate pressure head below the geocomposite drainage layer at the first sensor location E4.5 m indicates that significant leachate pressure head loss occurs as the injected leachate travels through the geocomposite drainage layer. During the monitoring period, the pressure head measured at the first sensor location E4.5 m never exceeded the injection pressure head.

The temperature of the geocomposite drainage layer was also affected by leachate recirculation. The temperature in the geocomposite drainage layer temporarily decreased due to the arrival of injected leachate. This occurred because the temperature of the injected leachate was almost always less than the temperature of the geocomposite drainage layer. The temperature of the waste monitored using the vertical stress sensor located immediately outside the one edge of the geocomposite drainage layer was approximately equal to or greater than the temperature recorded at the first sensor location E4.5 m (FIG. 21). The variation of the seasonal air temperature had a relatively small effect on the temperature of the geocomposite drainage layer due to the thermal insulation provided by the waste mass.

The sensors showed that the rate flow of injected leachate in the geocomposite drainage layer is a function of the leachate injection rate, the extent of wrinkles present in the geocomposite drainage layer before it is covered, the slope of the geocomposite drainage layer, and the degree heterogeneity in the hydraulic properties of underlying waste. During use, excess pressures were not developed in the vicinity of the geocomposite drainage layer indicating that the geocomposite drainage layer provided hydraulic continuity. The moisture content sensors embedded immediately below the geocomposite drainage layer were saturated during leachate injection demonstrating that the geocomposite drainage layer transported the leachate. No clogging of the geocomposite drainage layer was apparent during the 9 month test period as indicated by no change in the injection pressure for a given injection rate or during the 20 month monitoring period.

Simulation 1

The simulation shows the effect of the hydraulic properties of the waste and the permeable layer, the geometry of the permeable layer, the settlement of the permeable layer, the leachate dosing frequency, and the degree of saturation of the waste and the permeable layer on the hydraulic performance of permeable layers.

The simulation shows that to maintain a minimum liquid pressure build up in the permeable layer and to achieve the greatest wetted width in the permeable layer, the permeable layer should be constructed of a material having a high hydraulic conductivity. The simulation further shows that an increase in the thickness or depth of the permeable layer decreases the pressure head in the permeable layer, $h_p$. A permeable layer having a greater thickness is preferable if slope stability evaluation of the landfill requires lower pressure heads in the permeable layer. A thicker layer does not result in a greater wetted width of the waste and does not offer greater wetting of the underlying waste. Furthermore, the simulation shows that the greater the hydraulic conductivity of the underlying waste, the lower the wetted width $W_B$ and the lower the pressure head in the permeable layer $h_p$.

The simulation also shows that the greater the degrees of saturation of the waste and/or the permeable layer, the faster the rate of travel of injected leachate in the permeable layer and greater the pressure head in the permeable layer $h_p$. When leachate is injected in on/off dosing cycles, the initial degree of saturation of waste $S_W$ and the initial degree of saturation of the permeable layer $S_B$ increase until a steady-state approaches. The wetted width of waste $W_W$ and pressure head in the permeable layer $h_p$ are directly proportional to the on to off duration ratio and the magnitude of the liquid flux during the on period. In addition, the simulation shows that if the permeable layer settles, a greater leachate injection rate (or head) is needed to compensate for the loss in elevation head to maintain the same the saturated wetted width of waste, $W_W$.

The HYDRUS-2D computer model is used for the simulation to develop a conceptual model to numerically evaluate the use of permeable layers as a leachate recirculation system (FIG. 1). HYDRUS-2D is a computer model that can simulate water, heat, and solute movement or migration in unsaturated, partially saturated, or fully saturated porous media (Simunek, J., et al., The HYDRUS-2D Software Package for Simulating the 2-D Movement of Water, Heat, and Multiple Solutes in Variable Saturated Media, Version 2.0. U.S. Salinity Laboratory, Agriculture Research Service, USDA, Riverside, Calif. (1999)). The program numerically solves the Richards' Equation for saturated and unsaturated water flow. A 2-D form of Richards' equation can be expressed as follows:

$$\frac{\partial \theta}{\partial t} = -\nabla \cdot [k(\psi) \cdot \nabla \psi] + \frac{\partial k}{\partial z} - S$$

where, $\theta$=volumetric water content; $\psi$=matric suction head; k=hydraulic conductivity, which is $k_S$ for saturated soil but is strongly dependent on the soil suction; z=vertical dimension; S=volume of water removed per unit time per unit volume of soil by plant water uptake (sink term); and t=time.

The model uses van-Genuchten function for soil-water characteristic curves and van-Genuchten-Mualem model for predicting the unsaturated hydraulic conductivity function. The governing flow and transport equations are numerically solved using Galerkin-type linear finite-element schemes. Depending upon the scale of the problem domain, the matrix equations resulting from the discretization of the governing equations are solved using either Gaussian elimination for banded matrices, a conjugate gradient method for symmetric matrices, or the ORTHOMIN method for asymmetric matrices.

In this simulation, the municipal solid waste is assumed to be a homogeneous and isotropic porous medium having $k_W$ ranging from $10^{-7}$ m/s to $10^{-5}$ m/s ($3.3 \times 10^{-7}$ to $3.3 \times 10^{-5}$ ft/s). The effect of channeling is not considered. An average saturated hydraulic conductivity of waste, $k_W$, equal to $10^{-6}$ m/s ($3.3 \times 10^{-6}$ ft/s) is used in most simulations. These values are selected according to typical values published by Hughes et al. (1971); Fungaroli and Steiner (1979); Korfiatis et al. (1984); Oweis et al. (1990) and Bleiker et al. (1993).

The conceptual model includes a fluid injection system and a leachate collection system. The fluid injection system includes a permeable layer having a thickness of approximately 0.015 m (0.049 ft) and a perforated pipe having an inner diameter of approximately 0.1 m (0.33 ft). The perforated pipe is positioned through the center of the permeable layer essentially parallel to the plane formed by the permeable layer. The length of the permeable layer has a range between about 55 m to 150 m (180 ft and 492 ft). The vertical distance, D, between the permeable layer and the top of the leachate collection system ranges from about 5 m to 20 m (16 ft to 66 ft). The distance from the top of the permeable layer to the upper, zero flux boundary is approximately 5 m (16 ft). This distance allow for containment of all injected leachate and prevents possible artesian conditions for the simulated leachate injection rates. The leachate collection system includes two (2) perforated collection pipes having an inner diameter of 0.15 m (0.49 ft). The perforated collection pipes are embedded in a gravel layer having a thickness of 0.3 m (1 ft) and have a horizontal spacing, d, equal to approximately 60 m (196.8 ft). The slope (tan β) of the leachate collection system is equal to 3.5% (FIG. 1A). The hydraulic conductivity of the leachate collection system drainage material ($k_{LCS}$) is equal to $10^{-2}$ m/s. The leachate collection system design parameters ($t_{LCS}$, $k_{LCS}$, d, and tan β) result in less than 0.3 m leachate pressure head on the lining system for all simulations.

The saturated and unsaturated hydraulic properties of the simulated waste, the permeable layer material, and the leachate collection system gravel layer which are input into HYDRUS-2D are set forth in Table 2.

TABLE 2

Saturated and unsaturated hydraulic properties

| Landfill Unit | Material | Residual Volumetric Water Content $\theta_r$ | Saturated Volumetric Water Content $\theta_s$ | Fitting Parameter $\alpha$ (1/m) | Dimensionless Fitting Parameter N | Saturated Hydraulic Conductivity $k_s$ (m/s) |
|---|---|---|---|---|---|---|
| Waste | Silt loam | 0.078 | 0.45 | 3.6 | 1.54 | $10^{-5}$, $10^{-6}$ and $10^{-7}$ |
| Permeable Layer | Pea gravel | 0.01 | 0.3 | 57.4 | 2.44 | $10^{-2}$ and $10^{-3}$ |
| Permeable Layer | Crushed Glass | 0.02 | 0.47 | 12 | 5 | $3 \times 10^{-2}$ |
| Leachate Collection System | Pea gravel | 0.01 | 0.3 | 57.4 | 2.44 | $10^{-2}$ |

The leachate is simulated as pure water. Any reference to leachate flow corresponds to water flow. The results of the simulation can be applied to any injected liquids for bioreactor landfills as long as the liquid's physical and hydraulic properties are similar to that of water. The effect of gas flow, temperature and biochemical reactions occurring within the landfill are ignored.

All external boundaries are simulated as zero flux boundaries. The perforated pipe of the fluid injection system is simulated as a constant flux boundary. The flux (dimensions: $M^0L^1T^{-1}$) assigned to the boundary is calculated by dividing the leachate injection rate (dimensions: $M^0L^3 T^{-1}$) by the perimeter of the perforated pipe of the fluid injection system for a unit length of the perforated pipe. The leachate injection rates (Q) range from 1.1 to 3.6 m$^3$/hr/m. These rates are selected based on leachate injection rates used in the field for permeable layers tested in this study and other studies. The maximum leachate injection rate of 3.6 m$^3$/hr/m corresponds to the maximum rate the pump used in the simulation could deliver for the total head that existed for the system. The leachate injection rates Q in m$^3$/hr/m represents the leachate injection rate in cubic meters per hour per linear meter length of the pipe. The collection pipes embedded in the leachate collection system are simulated as seepage face boundaries. Leachate flow as a result of percolation from the cap or waste above the model domain is assumed to be zero.

The dosing cycles for leachate recirculation range from 2 hours on and 22 hours off to 8 hours on and 16 hours off to cover various dosing volumes and frequencies for a typical municipal solid waste landfill. Leachate injection is simulated as constant flux under a positive leachate injection pressure.

Figure 7:
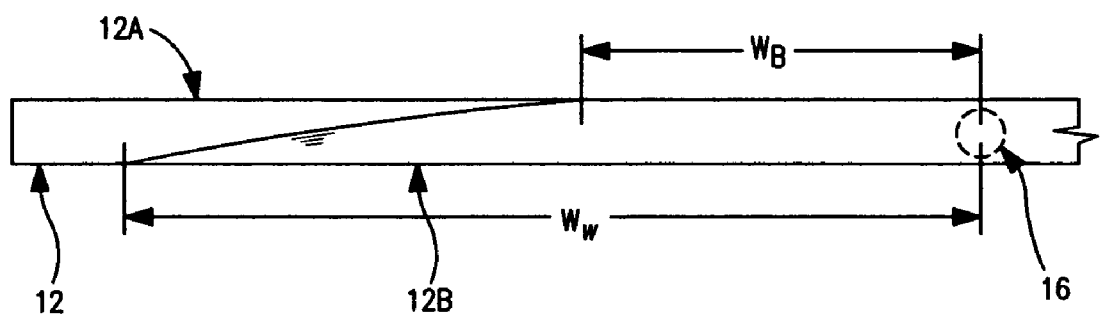
FIG. 7 is a schematic front view of the wetted front of the injected liquid 50 in the permeable layer 12 and the simulated wetted width of waste $W_w$ and the simulated wetted width of the permeable $W_B$.

The wetted width is the distance traveled by the injected leachate from the perforated pipe of the fluid injection system (FIG. 7). The wetted width of waste, $W_W$ and the saturated wetted width of the permeable layer, $W_B$ are different (FIG. 7). The wetted width of waste, $W_W$ is defined as the maximum distance traveled by the injected leachate from the perforated pipe in the permeable layer just above the underlying waste. The wetted width of waste, $W_W$ dictates the lateral extent of infiltration of the injected leachate through the underlying waste. The saturated wetted width of the permeable layer, $W_B$ is defined as the one-half (½) of the length of the permeable layer where the entire depth (thickness) of the permeable layer is 100% saturated (FIG. 7). For a fully saturated permeable layer having a length of approximately 60 m (196.8 ft), the saturated wetted width of the permeable layer, $W_B$ is 30 m (98.4 ft). The saturated wetted width of the permeable layer $W_B$ is always less than wetted width of waste $W_W$. The difference between wetted width of waste $W_W$ and the saturated wetted width of the permeable layer $W_B$ varies depending upon the leachate injection rate, the thickness of the permeable layer and the hydraulic properties of the permeable layer and waste.

The injected leachate temporarily increases the degree of saturation of the permeable layer and the pressure head in the permeable layer $h_p$. One key parameter that impacts the shear strength of the waste is the effective stress. The pressure head distribution in the permeable layer is a key factor for slope stability analysis of bioreactor landfills. The pressure head in the permeable layer $h_p$, is simulated by measuring the pressure head in the proximity or within 0.5 m (1.6 ft) of the perforated pipe at the bottom of the permeable layer (FIG. 1B). The pressure head in the permeable layer $h_p$ is always greater near the perforated pipe. The pressure head in the permeable layer $h_p$ is different from the injection pressure head, $h_i$ inside the perforated pipe. The pressure head in the permeable layer $h_p$ is a function of the leachate injection rate and the hydraulic properties of permeable layer and waste. It is believed that the pressure head in the permeable layer, $h_p$, can be used to interpret and monitor the hydraulic performance of the leachate recirculation system. For example, if the magnitude of the pressure head $h_p$ is close to the injection pressure head $h_i$, then there is good hydraulic continuity between the perforated pipe and the permeable layer. An increase in the difference between the injection pressure head $h_i$ and the pressure head of the permeable layer $h_p$ over time for a given magnitude of leachate injection rate, indicates a decrease in the hydraulic conductivity of the permeable layer or potential clogging of the perforated pipe.

Over 150 simulations using HYDRUS-2D were conducted to evaluate the effect of the hydraulic properties of the waste, the geometry of the permeable layer, the hydraulic properties of the permeable layer, the settlement of the permeable layer, the leachate dosing volume and frequency, and the degree of saturation of the waste and the permeable layer on the wetted width and pressure head of injected leachate in the permeable layer.

Unless specified otherwise, all simulations use a permeable layer having a length of approximately 60 m (196.8 ft) and a thickness or depth of 0.15 m (0.49 ft). The permeable layer has an initial degree of saturation $S_B$ of 50%. The initial degree of saturation of waste $S_W$ is 45%. The hydraulic properties of the permeable layer are those of pea gravel with a saturated hydraulic conductivity $k_B$ $10^{-2}$ m/s. The hydraulic properties of the solid waste are those of loam from HYDRUS-2D's database with a saturated hydraulic conductivity $k_W$ of $10^{-6}$ m/s. The vertical spacing or distance between the permeable layer and the leachate collection system D is 5 m.

To evaluate the effect of unsaturated hydraulic properties of municipal solid waste on the wetted width of waste $W_W$ and the pressure head in the permeable layer $h_p$, the municipal solid waste is simulated as sand and loam in two separate simulations. The saturated hydraulic conductivities of sand and loam are assigned a value of $10^{-6}$ m/s. Different soil-water characteristic curves are assigned for sand and loam from the HYDRUS-2D database. In the first simulation, leachate was continuously injected at an injection rate equal to 1.1 m³/hr/m for an injection period of 8 hours. In the second simulation, leachate was injected in dosing cycles of 4 hours on and 20 hours off for a total period of 7 days. The initial degrees of saturation for the permeable layer and the solid waste were equal for all simulations. The unsaturated hydraulic properties of loam were used for all simulations, unless it is specified otherwise. The results indicate that unsaturated hydraulic properties of the waste are critical only for short term analysis (less than 2 or 3 days). For long-term and recurring leachate injection analysis, unsaturated hydraulic properties of the material used to simulate municipal solid waste have virtually no influence on the wetted width and the pressure head of injected leachate in the permeable layer.

Figure 8A:
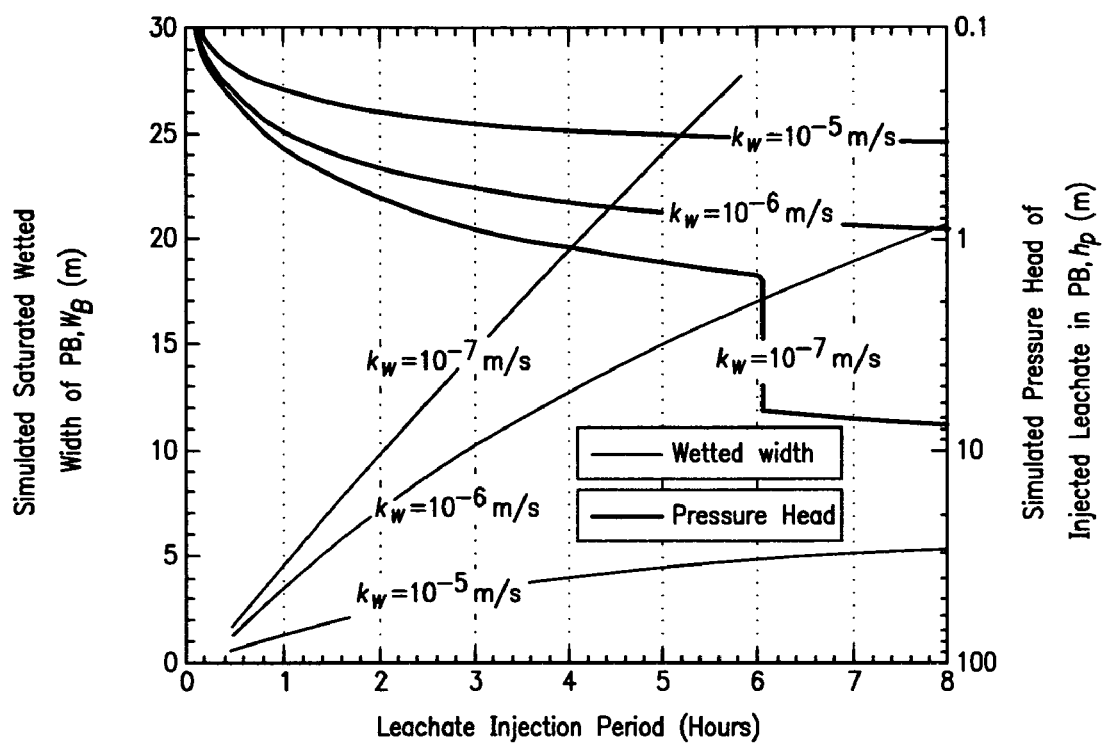
FIG. 8A is a graph of the simulated effect of the saturated hydraulic conductivity of solid waste $k_w$ on the simulated wetted width, $W_B$, and the pressure head of the injected liquid 50 in the permeable layer 12 (PB) $h_p$, overtime for $k_w$ equal to $10^{-5}$ m/s, $10^{-6}$ m/s and $10^{-7}$ m/s ($3.3\times10^{-5}$, $3.3\times10^{-6}$ and $3.3\times10^{-7}$ ft/s) for a liquid injection rate, Q, of 1.1 m$^3$/hr/m.
Figure 8B:
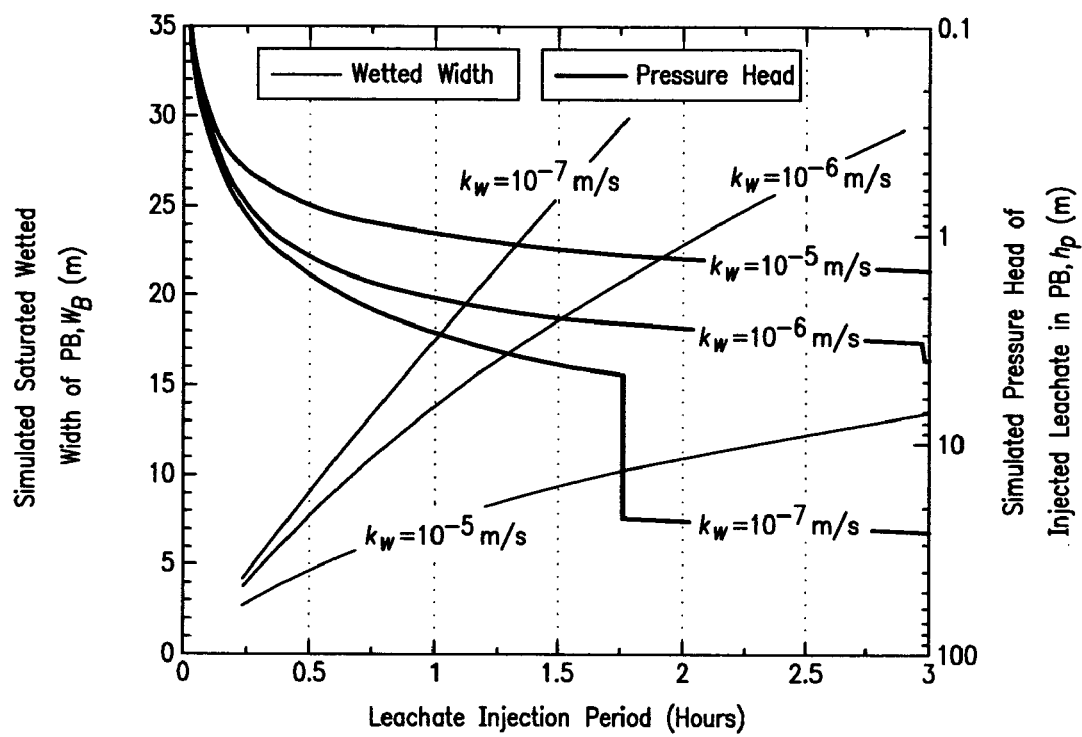
FIG. 8B is a graph of the simulated effect of the saturated hydraulic conductivity of solid waste $k_w$ on the simulated wetted width, $W_B$, and the pressure head of the injected liquid 50 in the permeable layer 12 (PB), $h_p$, overtime for $k_w$ equal to $10^{-5}$ m/s, $10^{-6}$ m/s and $10^{-7}$ m/s for a liquid injection rate, Q, of 3.6 m$^3$/hr/m.

The effect of the saturated hydraulic conductivity of waste $k_W$ on the simulated saturated wetted width of the permeable layer $W_B$ and the pressure head of the permeable layer $h_p$ in a permeable layer having a length of approximately 60 m (196.8 ft) was simulated (FIGS. 8A and 8B). The values of the saturated hydraulic conductivity of waste $k_W$ were $10^{-5}$, $10^{-6}$, and $10^{-7}$ m/s ($3.3 \times 10^{-5}$, $3.3 \times 10^{-6}$, $3.3 \times 10^{-7}$ ft/s). The simulated values are the typical reported values for municipal solid waste. In one simulation, the leachate injection rate Q is 1.1 m³/hr/m for an injection period of 8 hours (FIG. 8A). In another simulation, the leachate injection rate Q is 3.6 m³/hr/m for an injection period of 3 hours (FIG. 8B). For a saturated hydraulic conductivity of waste $k_W$ of $10^{-5}$ m/s ($3.3 \times 10^{-5}$ ft/s), the simulated saturated wetted width of the permeable layer $W_B$ is 6 m (20 ft) after 8 hours of continuous leachate injection The simulated pressure head in the permeable layer $h_p$ remained below 0.3 m (0.98 ft) throughout the leachate injection period. For a saturated hydraulic conductivity of waste $k_W$ of $10^{-7}$ m/s ($3.3 \times 10^{-7}$ ft/s), the saturated wetted width of the permeable layer $W_B$ reaches the maximum possible value of 30 m (98.4 ft) after 6 hours of continuous leachate injection for a permeable layer having a length of approximately 60 m (196.8 ft). The pressure head in the permeable layer $h_p$ rises as the injected leachate travels within the permeable layer and increases the degree of saturation of the permeable layer. Once the injected leachate reaches a distance of 30 m (98.4 ft), and the entire permeable layer is saturated, the pressure head in the permeable layer $h_p$ increases sharply as the storage capacity of the permeable layer is exceeded. The increase in the pressure head $h_p$ is greater where the underlying municipal solid waste has a lower hydraulic conductivity.

For a saturated hydraulic conductivity of waste $k_W$ of $10^{-5}$ m/s ($3.3 \times 10^{-5}$ ft/s), the simulated saturated wetted width of the permeable layer $W_B$ is about 17 m (55.8 ft) after an injection period of 3 hours for a leachate injection rate Q of 3.6 m³/hr/m compared to about 6 m (19.7 ft) for a leachate injection rate Q of 1.1 m³/hr/m after an injection period of 8 hours (FIG. 8B). The simulated pressure head in the permeable layer $h_p$ is 1.5 m (4.9 ft) for a leachate injection rate Q of 3.6 m³/hr/m. The pressure head in the permeable layer $h_p$ is 0.3 m (0.98 ft) for a leachate injection rate Q of 1.1 m³/hr/m. For a saturated hydraulic conductivity of waste $k_W$ of $10^{-6}$ and $10^{-7}$ m/s ($3.3 \times 10^{-6}$ and $3.3 \times 10^{-7}$ ft/s), the saturated wetted width of the permeable layer $W_B$ is 30 m (98.4 ft) after an injection period of 2.5 and 1.5 hours, respectively.

Figure 9A:
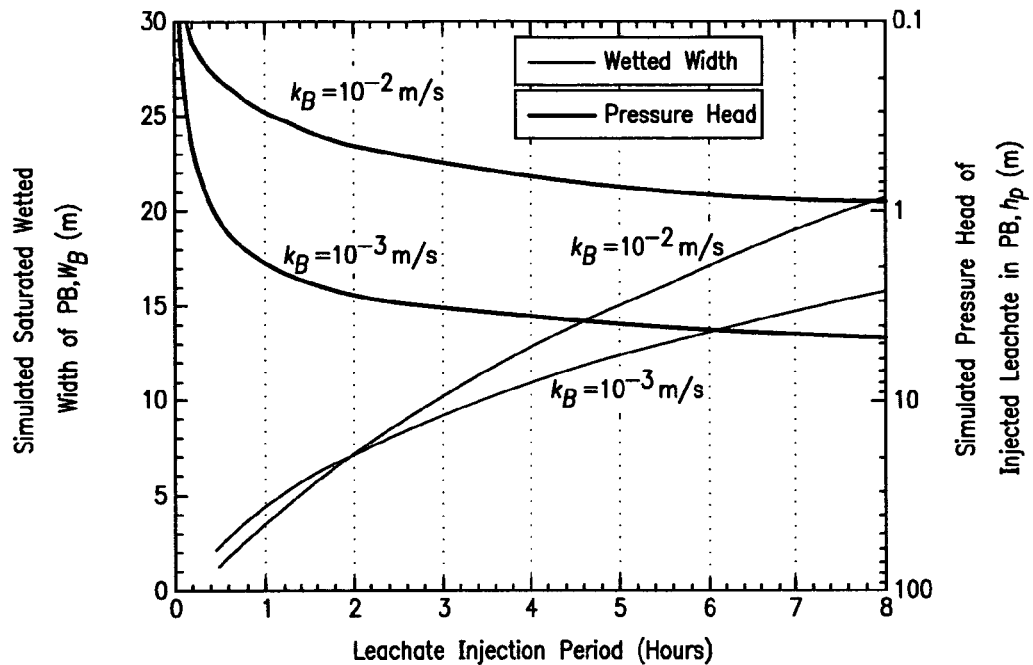
FIG. 9A is a graph of the simulated effect of the saturated hydraulic conductivity of the permeable layer 12 $k_B$, on the simulated wetted width, $W_B$, and the pressure head of the injected liquid 50 in the permeable layer 12 (PB), $h_p$, overtime for $k_B$ equal to $10^{-2}$ m/s and $10^{-3}$ m/s for a liquid injection rate, Q, of 1.1 m$^3$/hr/m.
Figure 9B:
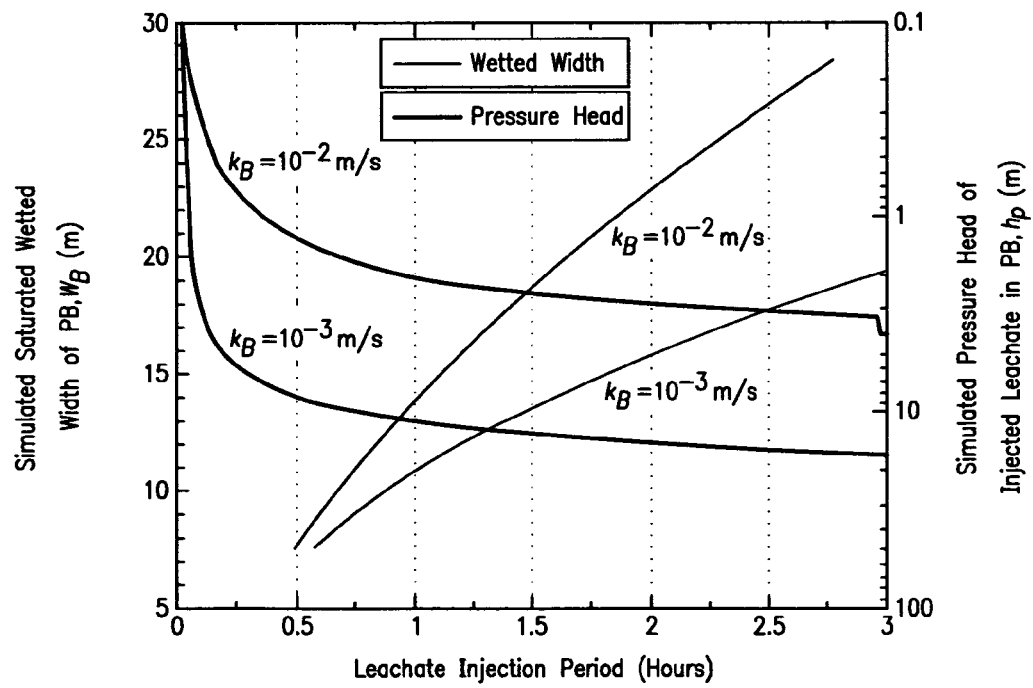
FIG. 9B is a graph of the simulated effect of the saturated hydraulic conductivity of the permeable layer 12, $k_B$ on the simulated wetted width, $W_B$, and the pressure head of the injected liquid 50 in the permeable layer 12 (PB), $h_p$, for $k_B$ equal to $10^{-2}$ m/s and $10^{-3}$ m/s for a liquid injection rate, Q, of 3.6 m$^3$/hr/m.

The saturated hydraulic conductivity of the permeable layer $k_B$ varies depending on the permeable material used to construct the permeable layer. A greater hydraulic conductivity is preferable when selecting a material for the permeable layer. The effect of the saturated hydraulic conductivity of the permeable layer, $k_B$ on the simulated saturated wetted width of the permeable layer $W_B$ and the pressure head in the permeable layer $h_p$ for a permeable layer having a length of approximately 60 m (196.8 ft) for a saturated hydraulic conductivity of waste $k_W$ of $10^{-6}$ m/s was simulated (FIG. 9). The effect of the saturated hydraulic conductivity of the permeable layer material $k_B$ on the saturated wetted width of the permeable layer $W_B$ and the pressure head in the permeable layer $h_p$ is simulated using saturated hydraulic conductivity $k_B$ values equal to $10^{-2}$ and $10^{-3}$ m/s. The leachate injection rate Q is 1.1 m³/hr/m for an injection period of 8 hours (FIG. 9A) and 3.6 m³/hr/m for an injection period of 3 hours (FIG. 9B). The injected leachate travels at a slower rate for permeable layers having a lower saturated hydraulic conductivity $k_B$ and results in a greater pressure head in the permeable layer $h_p$ for a given leachate injection rate.

Figure 10:
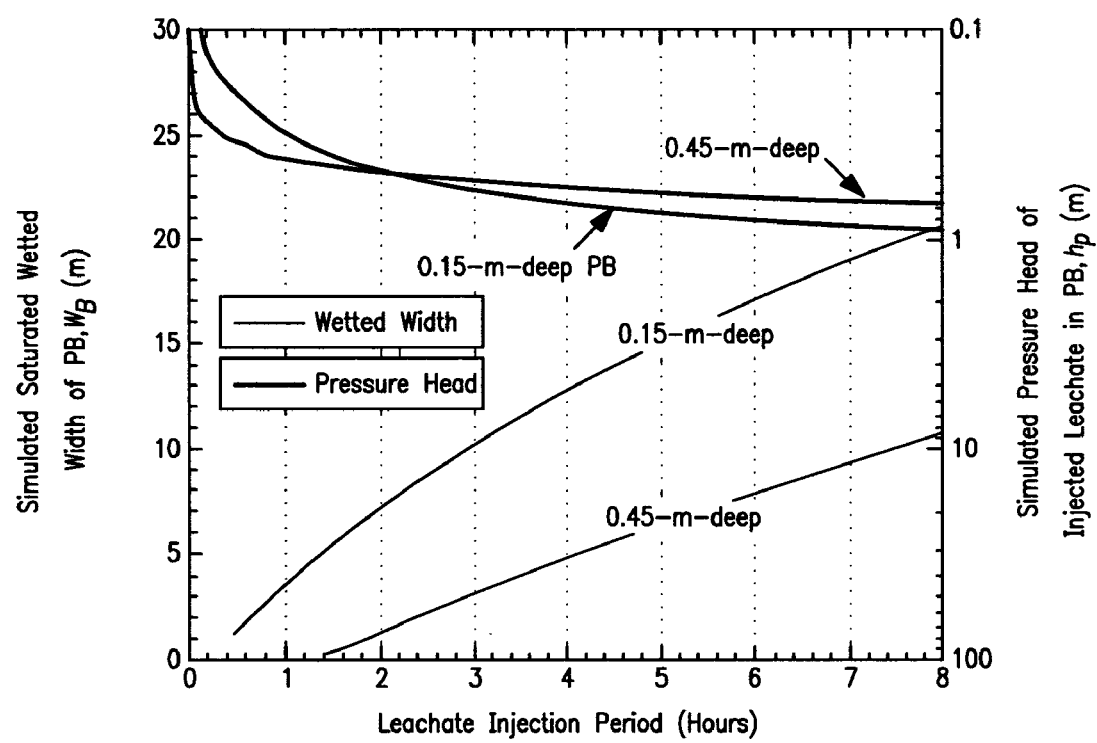
FIG. 10 is a graph of the effect of the thickness (depth) of the permeable layer 12 on the simulated wetted width $W_B$ and the pressure head of the injected liquid 50 in the permeable layer 12, $h_p$, overtime for a permeable layer 12 (PB) having a length of approximately 60 m (200 ft), for the saturated hydraulic conductivity of the waste, $k_W$, of $10^{-6}$ m/s, for a saturated hydraulic conductivity of the permeable layer 12, $k_B$, of $10^{-2}$ m/s, for a liquid injection rate Q of 1.1 m$^3$/hr/m, for an initial degree of saturation of the permeable layer 12, $S_B$, of 50% and an initial degree of saturation of the waste, $S_W$, of 45% for depths (thicknesses) of 0.45 m (1.47 ft) and 0.15 m (0.49 ft) for the permeable layer 12.

To simulate the effect of the depth or thickness of the permeable layer on the wetted width and pressure head of injected leachate in the permeable layer, two simulations are conducted using permeable layer thickness values of 0.15 m (0.49 ft) and 0.45 m (1.47 ft). The saturated hydraulic conductivity of waste $k_W$ is equal to $10^{-6}$ m/s ($3.3 \times 10^{-6}$ ft/s) and the leachate injection rate Q is equal to 1.1 m³/hr/m for an injection period of 8 hours. Simulation results indicate that the saturated wetted width of the permeable layer $W_B$ decreases as the permeable layer depth increases (FIG. 10). However, the wetted width of waste $W_W$ does not differ significantly between the two different depths of the permeable layer. As the depth of permeable layer increases, the storage capacity of the permeable layer increased. The increase in storage capacity results in a lower $h_p$ for the thicker permeable layer. A thinner permeable layer is preferable to reduce the cost of constructing the permeable layer. A thicker permeable layer is preferable to keep the pressure head of the permeable layer $h_p$ in an acceptable range for slope stability concerns.

The effect of the length of the permeable layer on the saturated wetted width of the permeable layer $W_B$ is evaluated by simulating two permeable layers having different lengths. Permeable layers having lengths of approximately 60 m (196.8 ft) and 150 m (492.1 ft) are used. In the simulations, the saturated hydraulic conductivity of waste $k_W$ is equal to $10^{-6}$ m/s ($3.3 \times 10^{-6}$ ft/s) and the leachate injection rate Q is equal to 1.1 m³/hr/m. The injection period is 8 hours. The simulation results indicate that the permeable layer length has no effect on the wetted width of the waste $W_W$ or the saturated wetted width of the permeable layer $W_B$ or the leachate pressure head $h_p$.

The effect of vertical spacing between the permeable layer and the leachate collection system is evaluated by simulating a vertical spacing D equal to 5 m (16.4 ft) and 20 m (65.6 ft). The saturated hydraulic conductivity of waste $k_W$ is equal to $10^{-6}$ m/s ($3.3 \times 10^{-6}$ ft/s) and the leachate injection rate Q is equal to 1.1 m³/hr/m for an injection period of 8 hours. The simulation results indicate that D does not influence the wetted width or the leachate pressure head $h_p$.

The effect of the settlement of waste and the settlement of the permeable layer on leachate flow through the permeable layer is simulated. The composition of waste, climate, presence or absence of leachate recirculation, and other physical and biochemical factors impact the settlement of waste in landfills. Due to the differential settlement of waste, permeable layers constructed within waste will also undergo differential settlement. Settlement of waste in landfills has been reported to range from 10% to 30% of its initial thickness. The effect of settlement of waste on the leachate flow through a permeable layer having a length of approximately 60 m (196.8 ft) is evaluated by simulating a 3 m (10 ft) deep sag at the center of the permeable layer. The 3 m (10 ft) deep sag represents differential settlement equal to 3 m (10 ft). The simulation results indicate that for leachate injection pressure heads less than the magnitude of the simulated sag, the leachate flux is less than that for a horizontal permeable layer and the injected leachate can not fill up the entire permeable layer. The leachate injection rate needs to be increased to create an additional injection pressure head that can compensate for the sag. Once the injection pressure head was greater than or equal to the magnitude of the sag, the leachate flux is essentially equal to the leachate flux for a horizontal permeable layer, the injected leachate fills up the entire permeable layer resulting in a greater wetted width of waste $W_W$ and a greater saturated wetted width of the permeable layer, $W_B$.

Figure 11A:
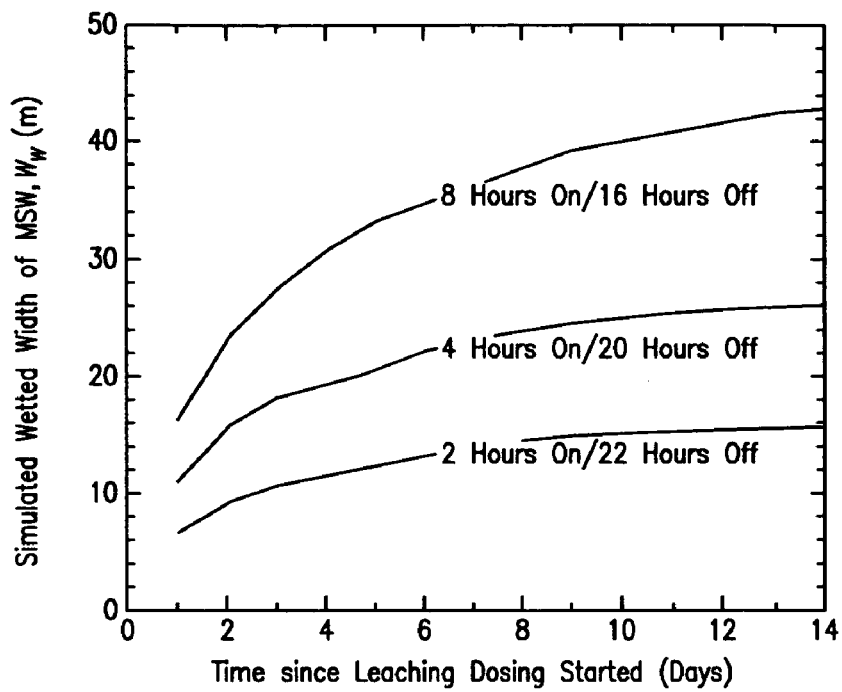
FIG. 11A is a graph of the simulated wetted width of waste, $W_W$, as a function of the dosing frequency for a permeable layer 12 having a length of 150 m for a liquid injection rate, Q, of 1.1 m$^3$/hr/m, a saturated hydraulic conductivity of the waste, $k_W$, of 10$^{-6}$ m/s, a saturated hydraulic conductivity of the permeable layer 12 (PB), $k_B$, of 10$^{-2}$ m/s, an initial degree of saturation of the permeable layer 12, $S_B$, of 30% and an initial degree of saturation of the waste $S_W$ of 30%.

Simulations are conducted to determine the effect of dosing frequency on the wetted width of waste $W_W$. For the simulation, the leachate injection rate Q is equal to 1.1 m$^3$/hr/m. The simulation is conducted for leachate injection dosing frequencies of 2 hours on and 22 hours off, 4 hours on and 20 hours off, and 8 hours on and 16 hours off. Where the saturated hydraulic conductivity of waste $k_W$ is equal to 10$^{-6}$ m/s (3.3×10$^{-6}$ ft/s) and the initial degree of saturation of waste $S_W$ and the initial degree of saturation of the permeable layer $S_B$ are equal to 30%, the wetted width of waste $W_W$ is a function of the ratio of on to off leachate injection duration (FIG. 11A). The wetted width of waste, $W_W$ is greater for a dosing cycle where the on to off times ratio is greater. For a given dosing frequency, the wetted width of waste $W_W$ increases as the number of leachate dosing days increases until the wetted width of waste $W_W$ reaches a constant maximum value ranging from 15 to 45 m (49 to 148 ft) depending on the on to off duration ratio after almost ten days (FIG. 11A).

Figure 11B:
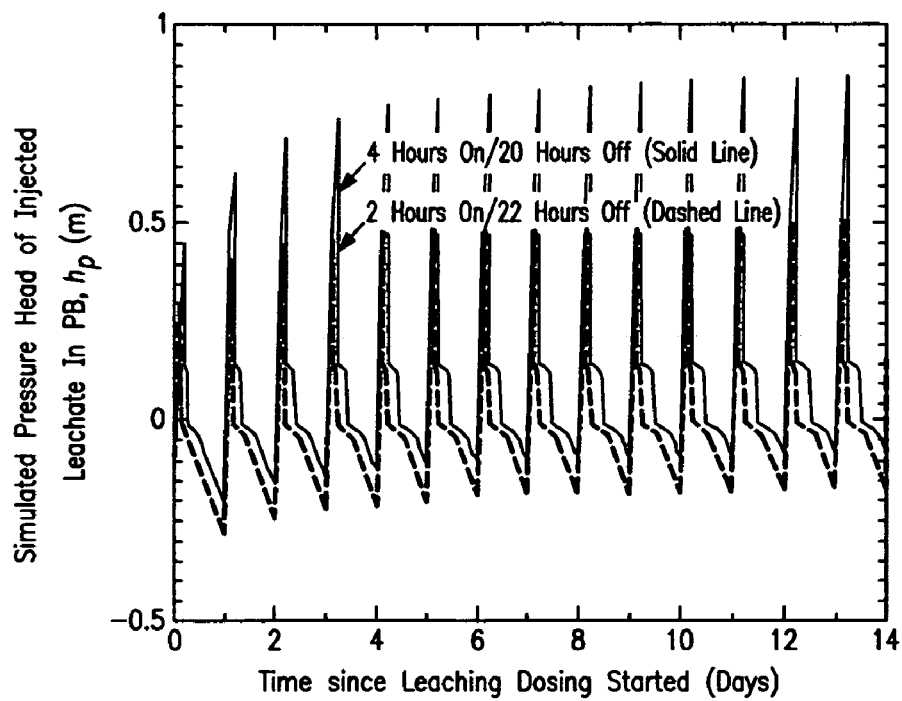
FIG. 11B is a graph of the simulated pressure head of injected liquid 50 in the permeable layer 12 (PB), $h_p$, as a function of the dosing frequency for a permeable layer 12 having a length of 150 m for a liquid injection rate, Q, of 1.1 m$^3$/hr/m, a saturated hydraulic conductivity of the waste, $k_W$, of 10$^{-6}$ m/s, a saturated hydraulic conductivity of the permeable layer 12, $k_B$, of 10$^{-2}$ m/s, an initial degree of saturation of the permeable layer 12, $S_B$, of 30% and an initial degree of saturation of the waste $S_W$ of 30%.

The pressure head of injected leachate in the permeable layer $h_p$ for the dosing frequencies of 2 hours on and 22 hours off and 4 hours on and 20 hours off is also measured (FIG. 11B). For a given dosing frequency, the pressure head of injected leachate in the permeable layer $h_p$ increases and then remains almost constant as the leachate dosing continues and the system almost reaches a steady-state. The initial increase is due to the increase in the degree of saturation of the waste and the permeable layer. The magnitude of the pressure head of injected leachate in the permeable layer $h_p$ is a function of the on to off duration ratio. The greater the on to off duration ratio, the greater, the magnitude of the pressure head of injected leachate in the permeable layer $h_p$.

Figure 12A:
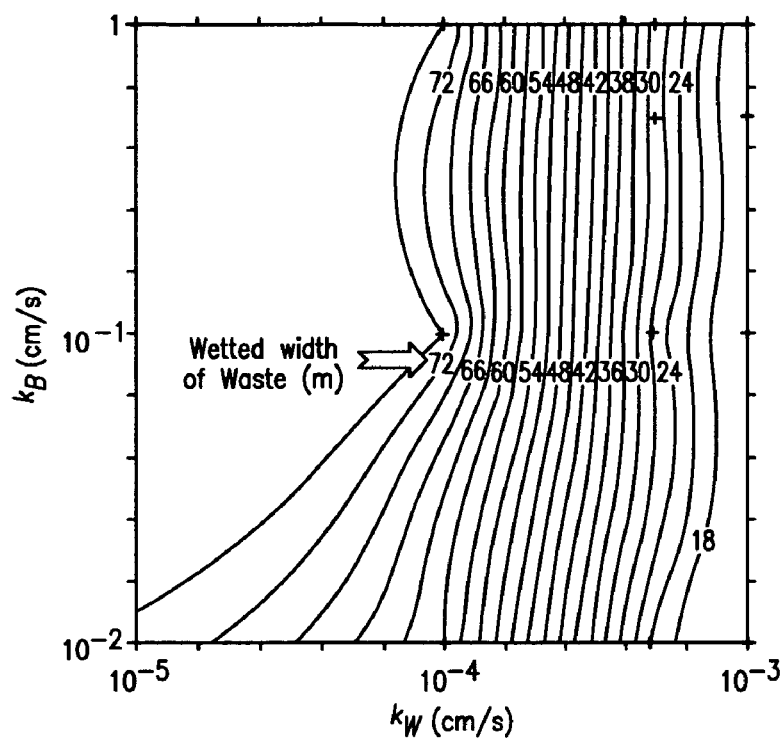
FIG. 12A is a plot of the contours of the simulated maximum wetted width of waste 100 at steady state as a function of the saturated hydraulic conductivity of the permeable layer 12, $k_B$, and the saturated hydraulic conductivity of waste 100, $k_W$ for a constant injection rate, Q, of 1.1 m$^3$/hr/m.
Figure 12B:
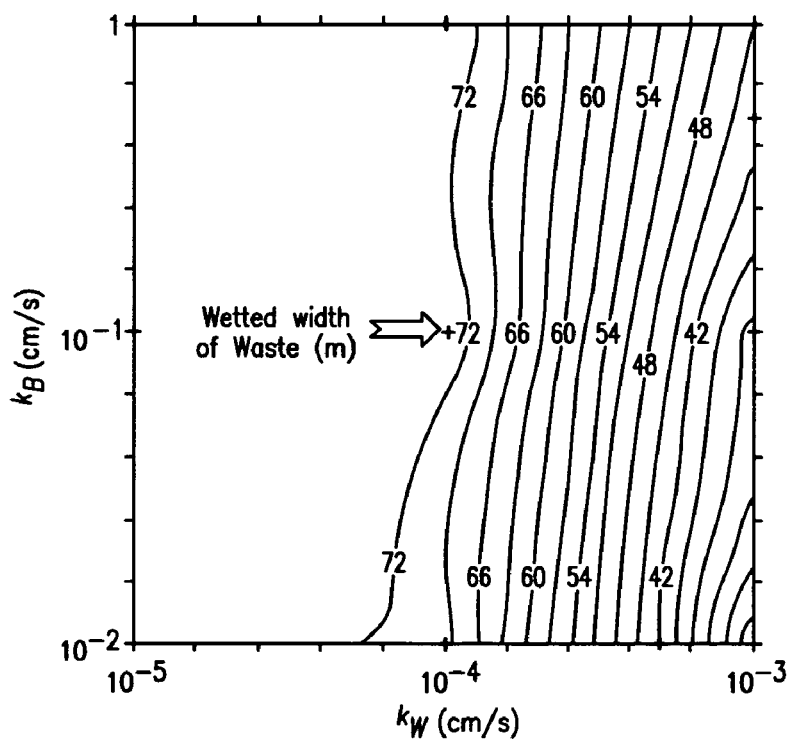
FIG. 12B is a plot of the contours of the simulated maximum wetted width of waste 100 at steady state as a function of the saturated hydraulic conductivity of the permeable layer 12, $k_B$ and the saturated hydraulic conductivity of the waste, $k_W$ for a constant injection rate, Q, of 3.6 m$^3$/hr/m.

Simulation is also used to evaluate the effect of continuous leachate injection (until steady-state is reached) on the wetted width of waste $W_W$ to obtain the maximum possible wetted width for a given leachate injection rate. The wetted width of waste $W_W$ for a permeable layer having a length of 150 m (492 ft) using continuous leachate injection at a leachate injection rate Q equal to 1.1 m$^3$/hr/m (FIG. 12A) and a leachate injection rate Q equal to 3.6 m$^3$/hr/m (FIG. 12B) is measured as a function of the saturated hydraulic conductivity of waste $k_W$ and the saturated hydraulic conductivity of the permeable layer material $k_B$. The saturated hydraulic conductivity of waste $k_W$ varied from 10$^{-7}$ m/s (3.3×10$^{-7}$ ft/s) to 10$^{-5}$ m/s (3.3×10$^{-5}$ ft/s) and the saturated hydraulic conductivity of the permeable layer material $k_B$ varied from 10$^{-4}$ m/s (3.3×10$^{-4}$ ft/s) to 10$^{-2}$ m/s (3.3×10$^{-2}$ ft/s) during the simulation. The simulated wetted width of waste $W_W$ is mainly a function of saturated hydraulic conductivity of waste $k_W$ as long as the saturated hydraulic conductivity of the permeable layer material $k_B$ is greater than the saturated hydraulic conductivity of waste $k_W$. The simulated maximum wetted width of waste $W_W$ increases as the saturated hydraulic conductivity of waste $k_W$ decreases. Either increasing the leachate injection rate Q or reducing the saturated hydraulic conductivity of waste $k_W$ can increase the wetted width of waste $W_W$.

Figure 13:
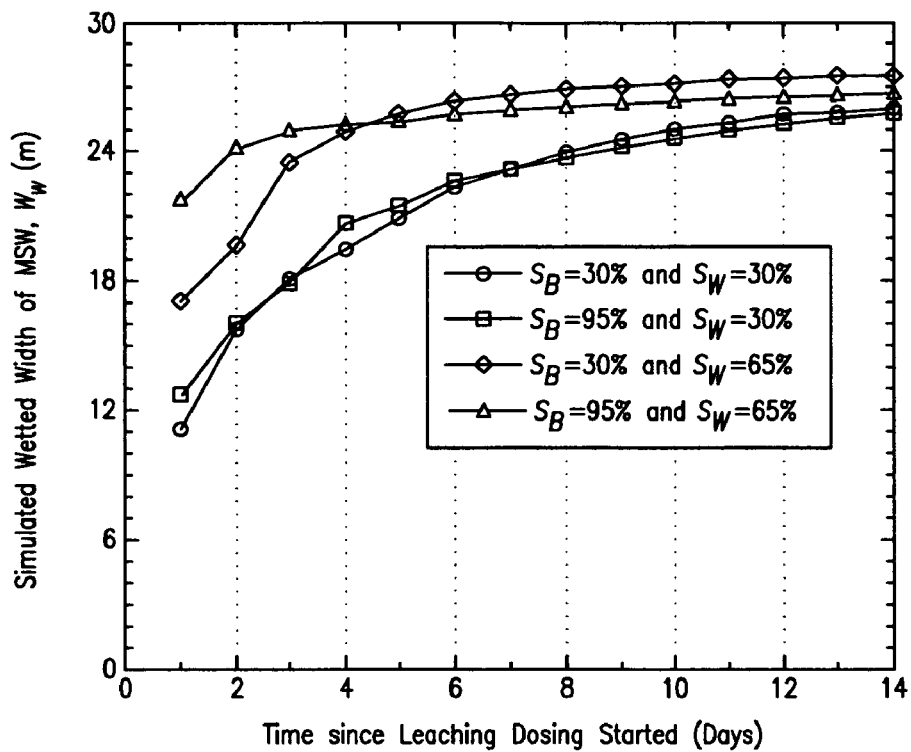
FIG. 13 is a graph of the simulated maximum wetted width of waste $W_W$ at the end of daily leachate injection events as a function of the initial degrees of saturation of waste 100, $S_W$ and the permeable layer 12, $S_B$, for a permeable layer 12 having a length of 150 m (492.1 ft) for a liquid injection rate, Q, of 1.1 m$^3$/hr/m for A hours on and 20 hours off, a saturated hydraulic conductivity of the permeable layer, $k_B$, of 10$^{-2}$ m/s and a saturated hydraulic conductivity of waste, $k_W$, of 10$^{-6}$ m/s.

A simulation is used to determine the rate of travel of injected leachate in a permeable layer as a function of the initial degrees of saturation of the waste $S_W$ and of the permeable layer $S_B$. The effect of initial conditions $S_W$ and $S_B$ on the simulated wetted width of waste $W_W$ for a permeable layer having a length of 150 m (492 ft) where the saturated hydraulic conductivity of waste $k_W$ is equal to 10$^{-6}$ m/s 93.3×10$^{-6}$ ft/s) and the leachate injection rate Q is equal to 1.1 m$^3$/hr/m for a dosing frequency of 4 hours on and 20 hours off are measured (FIG. 13). Four possible sets of initial conditions are used with the initial degree of saturation of waste $S_W$ ranging from 30% to 65% and the initial degree of saturation of the permeable layer $S_B$ ranging from 30% to 95%. The range of initial degrees of saturation is selected based on the typical range of values observed in the field for bioreactor landfills. For all four sets of simulations, the wetted width of waste $W_W$ increases as the number of leachate dosing days increases. However, irrespective of the initial degrees of saturation of the waste and the permeable layer, the maximum wetted width of waste $W_W$ is about the same after a few days (long-term) of leachate dosing for a set leachate injection rate Q and dosing frequency. It takes a progressively longer time to reach the maximum wetted width of waste $W_W$ for lower initial degrees of saturation $S_W$ and $S_B$ (FIG. 13).

Figure 14:
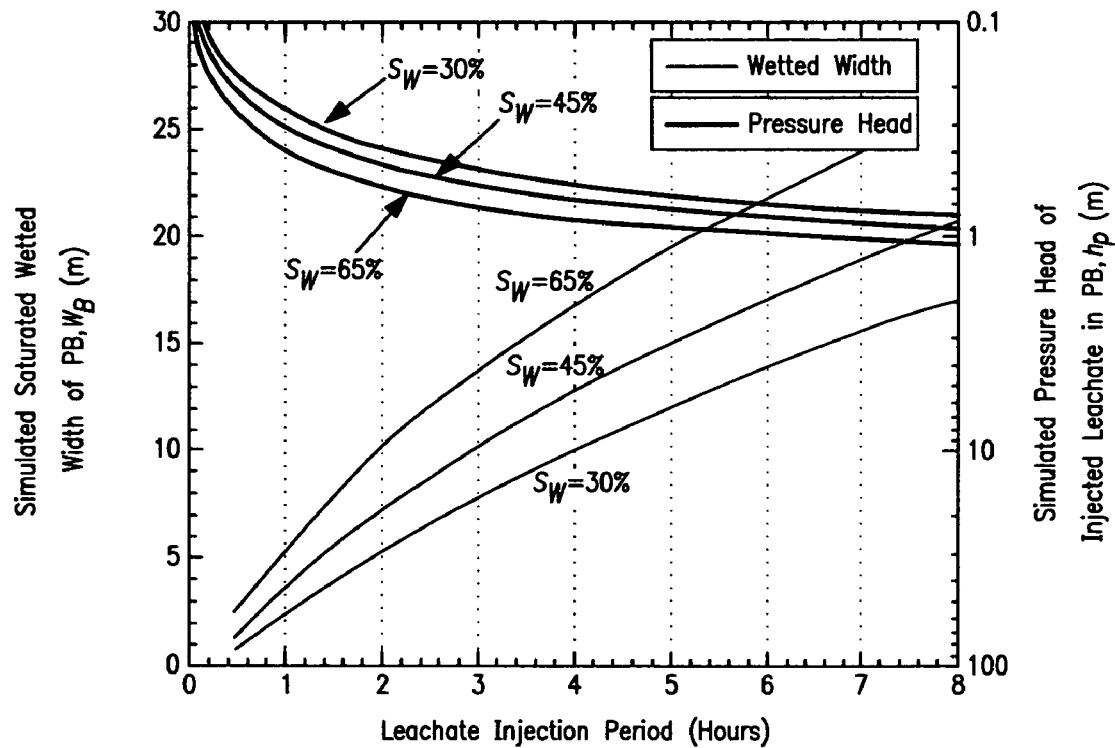
FIG. 14 is a graph of the simulated wetted width, $W_B$, and pressure head of injected liquid 50 in a permeable layer 12 (PB), $h_p$, as a function of the degree of saturation of waste, $S_W$, for a permeable layer 12 having a length of approximately 60 m (200 ft) with a liquid injection rate, Q, of 1.1 m$^3$/hr/m, a saturated hydraulic conductivity of the permeable layer 12, $k_B$, of 10$^{-2}$ m/s, a saturated hydraulic conductivity of waste, $k_W$, of 10$^{-6}$ m/s and an initial degree of saturation of the permeable layer 12, $S_B$, of 50%.

A simulation is used to determine the effect the degree of saturation of waste plays in operating an efficient bioreactor landfill. The effect of the initial degree of saturation of waste is evaluated by simulating initial degree of saturation of waste $S_W$ values equal to 30%, 45%, and 65%. Porosity of the waste is equal to 0.45, the initial degree of saturation of waste $S_W$ values correspond to volumetric water contents ranging from 0.15 to 0.3 units. The effect of the initial degree of saturation of waste $S_W$ on the saturated wetted width of the permeable layer $W_B$ and the pressure head of the injected leachate in the permeable layer $h_p$ in a permeable layer having a length of approximately 60 m (196.8 ft) for a saturated hydraulic conductivity of waste $k_W$ equal to 10$^{-6}$ m/s (3.3×10$^{-6}$ ft/s) and a leachate injection rate Q equal to 1.1 m$^3$/hr/m over a period of 8 hours of continuous leachate injection is measured. The initial degree of saturation of the permeable layer $S_B$ is maintained at 50% for all simulations. The results show that the greater the initial degree of saturation of waste $S_W$, the faster the rate of travel of the injected leachate (FIG. 14). When the leachate injection is continued beyond 8 hours, the saturated wetted width of the permeable layer $W_B$ and the wetted width of waste $W_W$ reach a maximum value that is about the same for various initial degree of saturation of waste $S_W$ values indicating that a steady-state is reached.

Figure 15:
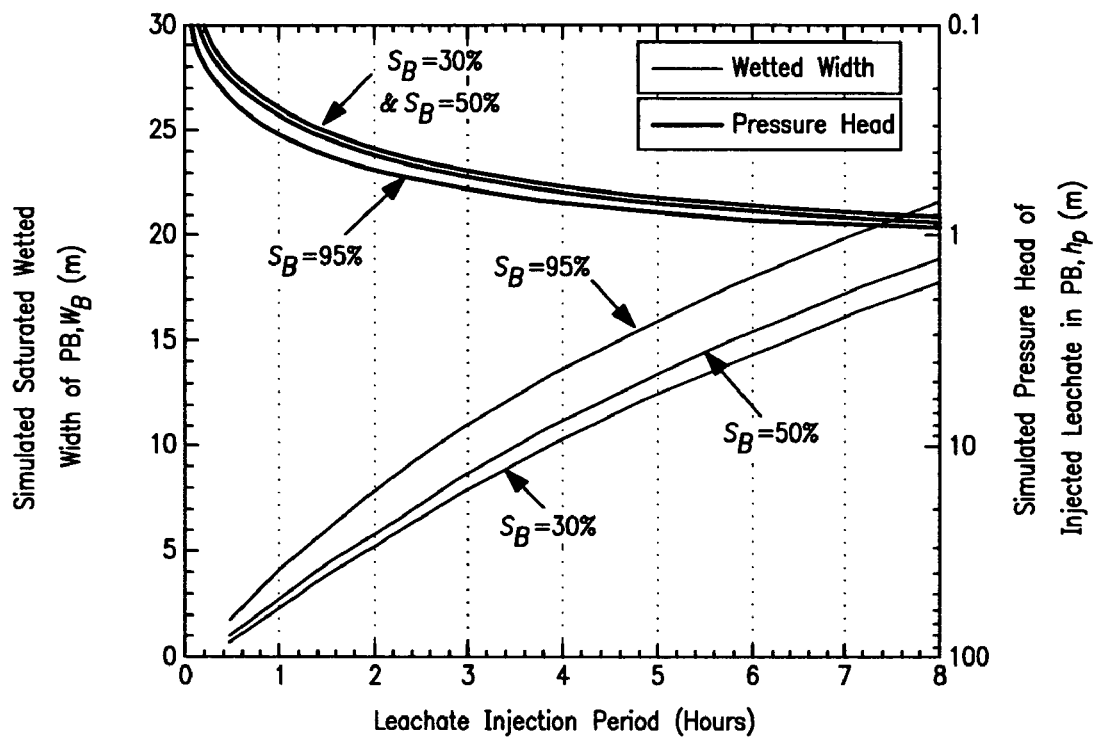
FIG. 15 is a graph of the simulated wetted width, $W_B$, and the simulated pressure head of the injected liquid 50 in the permeable layer 12 (PB), $h_p$, versus the liquid injection period as a function of the initial degree of saturation of the permeable layer 12, $S_B$, for a permeable layer 12 having a length of approximately 60 m (200 ft) for a liquid injection rate, Q, of 1.1 m$^3$/hr/m, a saturated hydraulic conductivity of waste, $k_W$, of 10$^{-6}$ m/s and an initial degree of saturation of the permeable layer 12, $S_B$, of 45%.

The degree of saturation of the permeable layer varies and depends upon the rate, duration and frequency of leachate dosing cycle, infiltration of precipitation, and the hydraulic properties of the surrounding waste and permeable layer. The initial degree of saturation of the permeable layer $S_B$ varies significantly over the operational life of the permeable layer. The effect of the initial degree of saturation of the permeable layer $S_B$ on the saturated wetted width of the permeable layer $W_B$ and the pressure head of the injected leachate in the permeable layer $h_p$ in a permeable layer having a length of approximately 60 m (196.8 ft) for a saturated hydraulic conductivity of waste $k_W$ equal to $10^{-6}$ m/s ($3.3 \times 10^{-6}$ ft/s) and the leachate injection rate Q equal to 1.1 m³/hr/m during an injection period of 8 hours is measured (FIG. 15). The simulated values of the initial degree of saturation of the permeable layer $S_B$ are equal to 30%, 65%, and 95%. The initial degree of saturation of waste $S_W$ is constant at 45%. The injected leachate travels faster for a greater initial degree of saturation of the permeable layer $S_B$ (FIG. 15). The difference in the rate of travel of the injected leachate for the various values of the initial degree of saturation of the permeable layer $S_B$ is small. The simulated pressure head of the injected leachate in the permeable layer $h_p$ differs only slightly for the various values of the initial degree of saturation of the permeable layer $S_B$.

The simulation also shows that as the injection head is increased, the leachate flux increases a permeable layer. The relationship is log-linear for permeable layer for injection heads greater than the breakthrough pressure head. The leachate flux linearly increases with an increase in the length of the permeable layer. The increase in the hydraulic conductivity of permeable layer material results in increase in leachate flux. However, for hydraulic conductivities greater than or equal to $5 \times 10^{-3}$ m/s $16.4 \times 10^{-3}$ ft/s), the difference is negligible.

It is intended that the foregoing description be only illustrative of the present invention and that the present invention be limited only by the hereinafter appended claims.

I claim

1. A system for injecting liquid into a portion of solid waste in a landfill which comprises:
   (a) a layer constructed of a permeable material having a hydraulic conductivity and having a first surface and an opposed second surface forming a plane of the layer, wherein the layer is configured to be positioned on the portion of solid waste in the landfill so that at least one surface of the layer is adjacent the solid waste;
   (b) at least one perforated pipe positioned inside the layer or adjacent to one of the first or second surfaces of the layer and parallel to the plane of the layer, wherein liquid is injected into the perforated pipe and moves from the perforated pipe into the layer and travels through the layer and into the portion of solid waste adjacent the surface of the of the layer; and
   (c) a plurality of sensors mounted in the layer to measure at least one characteristic of the liquid in the layer, wherein the characteristic comprises liquid flow rate in the layer.

2. The system of claim 1 wherein the layer has opposed ends and opposed sides with a length between the ends and a width between the sides, wherein the perforated pipe is positioned along the width of the layer so as to inject liquid along an entire width of the layer and wherein the permeable material has a hydraulic conductivity greater than the hydraulic conductivity of the portion of solid waste adjacent the layer so that the liquid travels through the length of the layer before a significant amount of the liquid exits the layer into the portion of solid waste adjacent the layer so that distribution of the liquid into the solid waste is essentially uniform along the length and width of the layer.

3. The system of claim 2 wherein the perforated pipe is positioned in the layer an equal distance from each of the ends of the layer and parallel to the ends of the layer so that the perforated pipe divides the layer into two essentially equal segments extending along the length of the layer.

4. The system of claim 1 further comprising a flow control valve, a pressure gauge and a flow gauge connected to the perforated pipe adapted to control and monitor liquid pressure head and fluid liquid flow rate in the perforated pipe.

5. The system of claim 1 wherein the permeable material is shredded rubber tires, pea gravel or crushed glass or any material which has a hydraulic conductivity greater than a hydraulic conductivity of the portion of solid waste adjacent the layer.

6. The system of claim 1 wherein the layer is constructed of a geocomposite drainage layer which includes a first geotextile, a second geotextile and a geonet layer spaced between the first and second geotextiles.

7. The system of claim 6 wherein the second geotextile is constructed of a woven material to minimize clogging of the layer due to the solid waste.

8. The system of claim 6 wherein the first geotextile is constructed of a non-woven material to prevent solid waste positioned from moving into the geonet.

9. The system of claim 1 wherein the layer has a thickness between the first and second surface of at least about 0.01 m and 0.6 m.

10. The system of claim 1 wherein when the layer is saturated, the hydraulic conductivity of the layer is between about $3 \times 10^{-2}$ and $10^{-3}$ m/s.

11. The system of claim 1 wherein the liquid is waste treatment liquid and wherein the layer is constructed of a reactive material and the waste treatment liquid reacts with the layer to reduce contaminants in the waste treatment liquid.

12. The system of claim 1 wherein the sensors are moisture content sensors, temperature sensors and pressure sensors.

13. The system of claim 1 wherein the sensors generate measured data and the data is used to control the amount of liquid injected into the perforated pipe.

14. The system of claim 1 further comprising a plurality of layers spaced apart with respect to each other at different levels within the solid waste in the landfill, each layer being constructed of a permeable material as described in part (a) comprising at least one perforated pipe positioned inside the layer as described in part (b) and a plurality of sensors as described in part (c).

15. A system for collecting and recirculating waste treatment liquid in a portion of solid waste in a landfill which comprises:
   (a) a layer constructed of a permeable material having a hydraulic conductivity and having a first surface and an opposed second surface forming a plane of the layer, the layer configured to be positioned on the portion of solid waste in the landfill so at least one surface of the layer is adjacent the solid waste of the landfill;
   (b) at least one perforated pipe positioned inside the layer or adjacent to one of the first or second surfaces of the layer and parallel to the plane of the layer;
   (c) a waste treatment liquid collection system including at least one perforated collection pipe embedded in a layer of hydraulically conductive material, wherein the waste treatment liquid collection system is positioned in the portion of solid waste of the landfill adjacent to and spaced apart from at least one surface of the layer, wherein the waste treatment liquid is injected into the layer through the perforated pipe and travels through the layer and is distributed into the solid waste adjacent at least one surface of the layer and moves downward through the portion of solid waste toward the waste treatment liquid collection system due to gravity and moves through the hydraulically conductive material of the waste treatment liquid collection system and into the perforated collection pipe; and (d) a plurality of sensors mounted in the layer to measure at least one characteristic of the liquid in the layer, wherein the characteristic comprises liquid flow rate in the layer.

16. The system of claim 15 wherein a suction or gravity driven system is connected to the perforated collection pipe to move the recirculated waste treatment liquid from the perforated collection pipe into a storage container.

17. The system of claim 16 wherein a hydraulic pump is connected between the storage container and the perforated pipe to move the recirculated waste treatment liquid from the storage container into the perforated pipe and into the layer.

18. The system of claim 15 wherein the waste treatment liquid collection system includes a liner which is positioned on a side of the perforated collection pipe opposite the layer.

19. The system of claim 15 wherein the sensors are moisture content sensors, temperature sensors and pressure sensors.

20. The system of claim 15 wherein the sensors generate measured data and the data is used to control the amount of liquid injected into the perforated pipe.

21. The system of claim 15 further comprising a plurality of layers spaced apart with respect to each other at different levels within the solid waste in the landfill, each layer being constructed of a permeable material as described in part (a) comprising at least one perforated pipe positioned inside the layer as described in part (b) and a plurality of sensors mounted in the layer as described in part (d).

* * * * *

UNITED STATES PATENT AND TRADEMARK OFFICE
CERTIFICATE OF CORRECTION

PATENT NO. : 7,537,415 B2
APPLICATION NO. : 11/980050
DATED : May 26, 2009
INVENTOR(S) : Milind V. Khire It is certified that error appears in the above-identified patent and that said Letters Patent is hereby corrected as shown below:

Column 7, line 36, "for A hours" should be --for 4 hours--.

Column 32, line 25, Claim 10, "3x10–2 and 10–3 m/s." should be --$3 \times 10^{-2}$ and $10^{-3}$ m/s.--.

Signed and Sealed this

Eighth Day of September, 2009

David J. Kappos
*Director of the United States Patent and Trademark Office*